United States Patent
Ohyama

(10) Patent No.: US 7,180,845 B2
(45) Date of Patent: Feb. 20, 2007

(54) OPTICAL PICKUP

(75) Inventor: Minoru Ohyama, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 46 days.

(21) Appl. No.: 10/519,027

(22) PCT Filed: Jun. 26, 2003

(86) PCT No.: PCT/JP03/08108

§ 371 (c)(1),
(2), (4) Date: Dec. 23, 2004

(87) PCT Pub. No.: WO2004/003901

PCT Pub. Date: Jan. 8, 2004

(65) Prior Publication Data

US 2005/0207316 A1    Sep. 22, 2005

(30) Foreign Application Priority Data

Jun. 28, 2002    (JP)    ............................. 2002-191506

(51) Int. Cl.
*G11B 7/00* (2006.01)
(52) U.S. Cl. .................. 369/112.16; 369/121
(58) Field of Classification Search ........... 369/112.16, 369/121
See application file for complete search history.

(56) References Cited

U.S. PATENT DOCUMENTS 5,392,274 A * 2/1995 Sofue .................. 369/112.16
5,428,596 A * 6/1995 Hineno et al. .......... 369/112.16
5,513,164 A * 4/1996 Tanaka et al. ............. 369/53.2
6,980,505 B2 * 12/2005 Katayama et al. ..... 369/112.17

FOREIGN PATENT DOCUMENTS

| JP | 06-325405 | 11/1994 |
|---|---|---|
| JP | 10-334500 | 12/1998 |
| JP | 2000-339745 | 12/2000 |
| JP | 2001-076370 | 3/2001 |
| JP | 2002-117572 | 4/2002 |
| JP | 2003-157568 | 5/2003 |

OTHER PUBLICATIONS

Translation of JP 2001-076370.*

* cited by examiner

*Primary Examiner*—Thang V. Tran
*Assistant Examiner*—Van T. Pham
(74) *Attorney, Agent, or Firm*—Nath Law Group PLLC; Gregory B. Kang; Stanley N. Protigal

(57) ABSTRACT

An optical pickup having a simple structure and that is capable of recording using a plurality of wavelengths is provided, comprising a primary laser light source for emitting a primary laser light having a first wavelength and that is of sufficient power for recording, an integrated device further comprising a secondary laser light source for emitting a secondary laser light having a second wavelength that is longer than the first wavelength and that is of sufficient power for recording as well as light receiving elements for receiving the light of the primary and secondary laser lights, and a polarized light beam splitter having polarization selectivity in respect of the secondary laser light.

15 Claims, 31 Drawing Sheets

FIG. 10

A DESIGN EXAMPLE OF PBS/
NPBS LAYER FOR WAVELENGTH SELECTION

|   |       | MATERIAL            | REFRACTIVE INDEX (nd) [587.56nm] | THICKNESS [nm] |
|---|-------|---------------------|----------------------------------|----------------|
|   | GLASS | SF57                | 1.847                            |                |
| 1 | L     | $Na_3AlF_6$         | 1.35                             | 658.89         |
| 2 | H     | $TiO_2$             | 2.24                             | 322.7          |
| 3 | L     | $Na_3AlF_6$         | 1.35                             | 513.28         |
| 4 | H     | $TiO_2$             | 2.24                             | 114.12         |
| 5 | L     | $Na_3AlF_6$         | 1.35                             | 495.34         |
| 6 | H     | $TiO_2$             | 2.24                             | 139.92         |
| 7 | L     | $Na_3AlF_6$         | 1.35                             | 574.28         |
| 8 | H     | $TiO_2$             | 2.24                             | 107.23         |
| 9 | L     | $Na_3AlF_6$         | 1.35                             | 494.98         |
| 10| H     | $TiO_2$             | 2.24                             | 178.46         |
| 11| L     | $Na_3AlF_6$         | 1.35                             | 215.26         |
|   | GLASS | SF57                | 1.847                            |                |

ANGLE OF INCIDENCE 45[deg.]

FIG. 20

A DESIGN EXAMPLE OF PBS / NPBS LAYER FOR WAVELENGTH SELECTION

|  |  | MATERIAL | REFRACTIVE INDEX (nd) [587.56nm] | THICKNESS [nm] |
|---|---|---|---|---|
|  | GLASS | SF57 | 1.847 |  |
| 1 | L | LaF$_3$ | 1.55 | 106.46 |
| 2 | H | TiO$_2$ | 2.24 | 121.18 |
| 3 | L | LaF$_3$ | 1.55 | 45.00 |
| 4 | H | TiO$_2$ | 2.24 | 130.45 |
| 5 | L | LaF$_3$ | 1.55 | 86.73 |
| 6 | H | TiO$_2$ | 2.24 | 131.12 |
| 7 | L | LaF$_3$ | 1.55 | 86.72 |
| 8 | H | TiO$_2$ | 2.24 | 130.44 |
| 9 | L | LaF$_3$ | 1.55 | 44.98 |
| 10 | H | TiO$_2$ | 2.24 | 121.14 |
| 11 | L | LaF$_3$ | 1.55 | 106.36 |
|  | GLASS | SF57 | 1.847 |  |

POLARIZATION SEPARATION

POLARIZATION INDEPENDENT

FIG. 24A

| GLASS/ | |
|---|---|
| 1 | 106.46F |
| 2 | 121.18T |
| 3 | 45F |
| 4 | 130.45T |
| 5 | 86.73F |
| 6 | 131.12T |
| 7 | 86.72F |
| 8 | 130.44T |
| 9 | 44.98F |
| 10 | 121.14T |
| 11 | 106.36F   PHYSICAL THICKNESS [nm] |
| /GLASS | |

FIG. 24B

GLASS:SF57 ($n_d$ = 1.847)
T : $TiO_2$    ($n_d$ = 2.24)
F : $LaF_3$    ($n_d$ = 1.55)

FIG. 25B

| GLASS/ | |
|---|---|
| 1 | 65.2S |
| 2 | 691.21T |
| 3 | 109.17S |
| 4 | 95.61T |
| 5 | 109.74S |
| 6 | 90.02T |
| 7 | 86.82S |
| 8 | 82.62T |
| 9 | 529.41S   PHYSICAL THICKNESS [nm] |
| /GLASS | |

FIG. 25C

| |
|---|
| GLASS:SF1  ($n_d$ = 1.718) |
| T : $TiO_2$  ($n_d$ = 2.24) |
| S : $SiO_2$  ($n_d$ = 1.46) |

FIG. 28B

| GLASS/ | |
|---|---|
| 1 | .40284H |
| 2 | 1.17335M |
| 3 | 1.15856L |
| 4 | .9177M |
| 5 | .96964H |
| 6 | .9128M |
| 7 | 1.06792L |
| 8 | .83839M |
| 9 | .89342H |
| 10 | 1.04261M |
| 11 | 1.13475L |
| 12 | 1.04261M |
| 13 | .89342H |
| 14 | .83839M |
| 15 | 1.06792L |
| 16 | .9128M |
| 17 | .96964H |
| 18 | .9177M |
| 19 | 1.15856L |
| 20 | 1.17335M |
| 21 | .40284H  PHYSICAL THICKNESS [nm] |
| /GLASS | |

FIG. 28C

GLASS:BK7 ($n_d = 1.5163$)
H : ($n_d = 2.35$)
M : ($n_d = 1.58$)
L : ($n_d = 1.35$)
$\lambda$ DESIGN = 1100 [nm]   *QWOT=1

FIG. 30B

| AIR / | |
|---|---|
| 1 | 1.01541H |
| 2 | 1.08053L |
| 3 | .98725H |
| 4 | .7809L  PHYSICAL THICNESS [nm] |
| / GLASS | |

FIG. 30C

GLASS : HIGH TRANSPARENCY (MEASUREMENT)
H : TiO$_2$     ($n_d$ = 2.24)
L : MgF$_2$    ($n_d$ = 1.38)
λ DESIGN = 2370 [nm]
*QWOT=1

OPTICAL PICKUP

FIELD OF THE INVENTION

The present invention relates to an optical pickup used for recording or reproducing optical information recorded to a medium such as an optical disk or the like.

BACKGROUND OF THE INVENTION

DVD's (Digital Versatile Disc) that have approximately seven times the capacity of CD's (Compact Disc) have rapidly gained in popularity in recent years. Further, DVD-videos that are capable of being reproduced in high-volume are replacing VHS and the like, tape mediums used as mediums for renting and distribution of contents of movies and other material.

Moreover, standards for recording such as DVD-RAM, DVD-R, DVD-RW, DVD+R and DVD+RW are becoming commonplace for PC drives and video recorder units.

Recordable CD-R is already commonly used.

In light of the above, recording functions for either the 650 nm band for DVD or the 780 nm band for CD are required in an optical disk recording device.

Further, compatibility in both recording and reproduction is needed for all of the various standards used for DVD, however the structure and functions of an optical pickup used for this are complex.

The need for such devices to be inexpensive, small and lightweight are increasing due to the demands of the general population, thus development of a simple, compact and inexpensive optical pickup, that is nonetheless complex and replete with multiple functions, is required.

An optical pickup furnishing the above functions is called a two wavelength recording pickup.

Generally, such a two wavelength recording pickup must fulfill the following requirements.

1. Optical System Dependent on Polarization-Optical System Independent of Polarization In a DVD recording type pickup, due to the combining of a PBS (polarized light beam splitter) and a wavelength plate (in a polarized light system) the efficiency of outward path (i.e. from the source) and return path should approach 100 percent and recording power must be maintained while the load on the laser light source is decreased.

In the case of a CD system the load on the laser light source is not so great, further a large number of CD disks with substantial birefringence are circulating in the market. Accordingly, in the CD line, polarized light independent systems have become the practical standard due to the need to avoid the side effect of deteriorating replay.

2. Beam Shaping

In order to effectively utilize the elliptical shaped beam intensity distribution of laser emitted light, normally in the case of DVD recording optical systems, a method is used in which a wedge shaped transmissive part is inserted making the intensity distribution round (beam formation). Beam formation is especially important in the case of DVD-RAM where high recording power is required. Limitations applying to beam formation include 1) it must be performed in parallel light beams and 2) beam formation in two wavelengths simultaneously in the same prism is difficult due to chromatic aberration.

In the case of CD systems the above described load on the laser source is light and such beam formation is unnecessary.

FIG. 1 provides an example of a conventional two wavelength recording pickup that fulfills the above described requirements in outline.

As shown in FIG. 1, a DVD laser light source 601, a collimator lens 602, a grating 603, a front monitor 604, a polarized light beam splitter 605, a ¼ wavelength plate 606, a dichroic mirror 607, a mirror 608, a secondary collimator lens 609, a detecting lens 610, light receiving elements 611, an integrated device providing a CD laser light source 612, a collimator lens 613, a mirror 614 and a secondary front monitor 615. The polarized light beam splitter 605 provides the above described function for intensity distribution formation.

After being emitted from the CD laser light source 612, CD laser light of the above described pickup is collimated at the collimator lens 613 passing via the mirror 614 (without undergoing beam formation) and is directed to an optical disk not shown in the drawing. Following the same path, returning light from the optical disk returns to the receiving elements inside the laser light source 612.

DVD laser light is emitted from the DVD laser light source 601 as P polarized light waves and after being made parallel at the collimator lens 602, passes via the grating 603 and is injected from an end 605a of the polarized light beam splitter (PBS) 605 before being reflected at a reflecting surface 605b. Thereafter, this DVD laser light passes via a PBS film surface 605d and is emitted from the other end 605c, before being formed into circular polarized light at the wavelength plate 606, attached so as to be in contact with the end 605c. The laser light is then directed to an optical disk not shown in the drawing. Returning light from the optical disk is made into S polarized light at the wavelength plate 606 and is reinjected into the end 605c of the polarized light beam splitter 605, reflected at the PBS film surface 605d of the polarized light beam splitter 605 (return path optical system is separated) and reaches the light receiving elements 611 via the detecting lens 610, after being collimated at the secondary collimator lens 609.

However, this pickup has separate respective collimator systems for the outward path and return path at the DVD side for example and as there are basically no common parts of the CD side and DVD side, the structure becomes complex as a large number of parts are required notwithstanding the integrated device.

FIG. 2 and FIG. 3 relate to an example of an optical pickup (Japanese Patent Application Laid-Open No. 6-325405) similar to the conventional optical pickup described above. This pickup is what is known as a "combo drive" optical pickup, capable of recording only on the CD side. To allow for cases when the output of the laser light source that outputs 780 nm band laser light is insufficient, this optical pickup has a beam forming means for 780 nm band laser light and is an optical system dependent on polarization.

That is to say, the CD laser light is emitted from a light source 702, passes via a collimator lens 712 and undergoes beam formation at a prism 713. The laser light is directed to a disk 709 passing via beam splitters 705 and 706, a wavelength plate 707 and objective lens 708. The return path light from the disk 709 passes via the wavelength plate 707 and the beam splitter 706 and is injected into the beam splitter 705. Due to the PBS properties of this beam splitter 705, the optical path of the CD laser light changes to the side having this collimator lens 704. This return path light undergoes a further optical path conversion at a PBS 703, returning to light receiving elements 711 after passing via a detecting system lens 710.

In the case of the DVD laser light, this light is emitted from a light source 701 and returns to the beam splitter 705 via the PBS 703 and collimator lens 704. Here, as shown in FIG. 3, the beam splitter 705 operates to reflect short wavelengths ($\lambda 1$) and as a PBS for long wavelengths ($\lambda 2$). Accordingly, DVD laser light from the light source 701 is reflected at the beam splitter 705, moreover is directed to the disk 709 after passing via the beam splitter 706, the wavelength plate 707 and the objective lens 708. Return path light from the disk 709 returns to the PBS 703 along the same path, passing via the objective lens 708, the wavelength plate 707, the beam splitter 706, the beam splitter 705 and the collimator lens 704. This return path light is separated at the PBS 703 and reaches the light receiving elements 711 passing via the detection system lens 710.

The PBS 703 is used to branch the outward and return optical paths in this optical pickup. Accordingly, the optical axis of emitted light and the optical axis of received light are disposed mutually separated at approximately 90 degrees such that concentration of the light receiving parts is not practically possible.

Moreover, the two wavelengths of the CD laser light and the DVD laser light are optical systems dependent on polarization, accordingly there is concern of deterioration in the replay performance of a CD disk having substantial birefringence.

FIG. 4 shows another example of an optical pickup, being that disclosed in Japanese Patent Application Publication Laid-Open No. 10-334500.

As shown in FIG. 4, this optical pickup is a replay pickup device using an integrated devices 801 and 802 that emit and/or receive light for the respective two wavelengths and having a prism 803 for separating and synthesizing the optical paths of the two wavelengths inserted in divergent light, such that the collimator lens 804 is shared.

That is to say, a laser beam emitted from a laser chip 805 of the primary integrated device 801 is injected into a wedge shaped prism 803 while diverging and after being reflected at the surface of the prism 803 enters a collimator lens 804. The primary laser light, formed into parallel light beams by this 804, passes via an aperture stop 806 and from an objective lens 807, is focused on the signal recording surface of the disk 709. Primary laser light reflected at this disk 709 returns to the prism 803 passing via the objective lens 807, the aperture stop 806 and the collimator lens 804. This primary laser light is reflected at the surface of the prism 803 and is received at light receiving elements 809 after passing via a hologram 808 of the primary integrated device 801.

On the other hand the secondary laser light emitted from a laser chip 810 of the secondary integrated device 802 and having a wavelength which differs to that of the primary laser light is injected into the wedge shaped prism 803 while diverging and, passing through this prism 803 enters the collimator lens 804. This secondary laser light, formed into parallel beams at the collimator lens 804 passes via the aperture stop 806 and is focused on the recording surface of the disk 709 by the objective lens 807. Secondary laser light reflected at this disk 709 returns to the prism 803 passing via the objective lens 807, the aperture stop 806 and the collimator lens 804. Passing through the prism 803, the secondary laser light is received at the light receiving elements 812 after passing a hologram 811 of the secondary integrated device 802.

The object of this optical pickup also is the utilization of integrated device, however two integrated devices are required and the same problem of requiring a complex structure persists. Further, this optical pickup is for reproduction and does not provide an optical system that more efficiently utilizes optical properties such as by beam formation and a polarized light system, thus even if high output laser is used this structure does not actually enable recording to an optical disk.

Moreover, as shown in FIG. 5, wavelength dependency of the polarized light beam splitter film appears to be used in the prism 803 of this optical pickup, but actually in the 650 nm band (the primary laser light) total reflection arises in a system independent of light polarization while in the 780 nm band (the secondary laser light) all the light passes in a system independent of light polarization, therefore this polarized light beam splitter film simply functions as a dichroic mirror.

A noticeable characteristic of this optical pickup is substantial dependence of the operation of the wavelength selecting film on angle of incidence, the optical pickup providing a film design in which, within a range of angles of divergent light, sufficient dichroic properties are realized independent of polarization. Further as the prism has a wedge angle, aberration occurring when a planar member is inserted in divergent light are cancelled out.

Accordingly, this optical pickup does not use polarized light for separation of two wavelengths, while the optical pickup can be applicable to a polarized light hologram.

Further, two integrated devices are necessary as a result of the progression towards integration and this leads unavoidably to complexities in structure and increased production costs.

When integration and miniaturization are pursued overall in a recording type optical pickup device in the case of a conventional optical pickup as described above, the following problems occur due to the requirements of a system accommodating each of the different wavelengths as described above.

1. Efficiency of Outward and Return Optical Path Separating Elements

In the above described optical system dependent on polarization, efficiency is achieved in what is largely an ideal outward and return path by use of a polarized light beam splitter, but in the case of a CD system which is a polarization independent optical system such efficiency cannot be realized. Thus, a polarization independent beam splitter is used for outward and return path separating elements in a CD system, and efficiency distribution placing priority on light intensity required at the surface when recording is required, this being a return path efficiency (or permeation efficiency when the returning path light passes) of 60 percent to 90 percent.

2. Heat Generation and Integration

A recording type optical pickup requires a high output laser in the 100 mW to 200 mW class. Accordingly substantial power is consumed and a concomitant rise in temperature due to heat generation is unavoidable when recording is performed, in other words, when the laser is generating light at high output.

With a conventional laser diode in can package light source expelling heat generated by the laser chip is relatively simple. In contrast to this however, in an integrated device in which the light receiving elements or hologram elements are integrated, a plurality of parts intercede in the path of heat conduction thereby preventing sufficient heat release.

In other words, a complex structure having a plurality of parts results if satisfactory heat release is to be achieved. Realizing both a simple structure and adequate heat release is difficult especially when two wavelengths share common optical paths and where integrated devices are used for both wavelengths.

SUMMARY OF THE INVENTION

An object of the present invention is to provide an optical pickup that can replay using a plurality of wavelengths and can record using at least one of the wavelengths, that is compact and of a simple structure and that realizes satisfactory release of heat from the light source of the wavelength used for recording.

In order to solve the above described problems, the optical pickup related to the present invention is an optical pickup that emits a primary laser light and a secondary laser light having different respective primary and secondary wavelengths that are used for recording to an information recording medium, this optical pickup comprising a primary laser light source emitting the primary laser light, an integrated device further comprising a secondary laser light source emitting the secondary laser light and light receiving elements as light reception means, these being grouped together as an integrated aggregate on the main surface of a substrate, and laser light optical path separating elements, wherein for the outward optical path of the primary laser light towards the information recording medium, the primary laser light follows a first optical path joining the primary laser light source and the laser light optical path separating elements, and after entering the laser light optical path separating elements is emitted therefrom, moreover thereafter the primary laser light follows a second optical path joining the laser light optical path separating elements and an information recording medium to be irradiated on to the information recording medium, wherein for the outward optical path of the secondary laser light towards the information recording medium, the secondary laser light follows a third optical path joining the integrated device and the laser light optical path separating elements, and after entering the laser light optical path separating elements is emitted therefrom, moreover, thereafter the secondary laser light travels the second optical path and is emitted to the information recording medium, and wherein for the return optical path of the primary laser light and the secondary laser light returning from the information recording medium, the primary and secondary laser lights travel the second optical path to enter the laser light optical path separating elements and after being emitted therefrom travel the third optical path entering the light receiving means of the integrated device.

Satisfactory release of heat of the primary laser light source is achieved and a simple structure of the optical pickup is realized by integration of the secondary laser light source with the light receiving elements. Further, the optical axes of the primary and secondary laser lights are perfectly on the same axis in respect of the laser light optical path separating elements.

Moreover, it is preferable that at least one of the primary laser light or the secondary laser light of this optical pickup has sufficient power for recording.

Again, this optical pickup realizes recording to the information recording medium using at least one of the primary laser light or the secondary laser light.

Moreover, it is preferable in this optical pickup that the laser light optical path separating elements have partial transmissive properties that pass a part and reflect a part of the primary laser light, have either substantially total transmissive or substantially total reflective properties in respect of the secondary laser light, and that the primary laser light and the secondary laser light follow the second optical path to be emitted to the information recording medium side and that the return optical path of the primary laser light and the secondary laser light from the information recording medium follows the third optical path to be emitted to the integrated device side.

Again, the laser light optical path separating elements of this optical pickup reflect outward path light emitted from the primary laser light source, pass outward path light emitted from the secondary laser light source and pass return path light reflected from the information recording medium originally emitted from the primary laser light source and return path light reflected from the information recording medium emitted originally from the secondary laser light source.

Further, it is preferable that the laser light optical path separating elements of this optical pickup have a separating ratio wherein between 70 percent and 90 percent of the primary laser light is reflected and the remainder is passed.

Again, it is preferable that the laser light optical path separating elements of this optical pickup pass outward path light emitted from the primary laser light source, reflect outward path light emitted from the secondary laser light source and reflect both return path light reflected from the information recording medium originally emitted from the primary laser light source and return path light reflected from the information recording medium emitted originally from the secondary laser light source.

Further, it is preferable that the laser light optical path separating elements of this optical pickup have a separating ratio wherein between 70 percent and 90 percent of the primary laser light is passed and the remainder is reflected.

Again, it is preferable that the laser light optical path separating elements of this optical pickup comprises a planar member wherein the surface into which the primary laser light is injected and the surface from which the primary laser light is emitted to the information recording medium and into which return path light of the primary laser light from the information recording medium is injected are the same surface.

Moreover, it is preferable in the laser light optical path separating elements of this optical pickup, that the angle of incidence of secondary laser light emitted from the secondary laser light source be less than 40 degrees and the thickness of the planar member be approximately less than 1 mm.

Further, it is preferable that the laser light optical path separating elements of this optical pickup are a polarized light beam splitter providing a first surface into which primary laser light is injected, a second surface from which primary laser light is emitted to the information recording medium side and into which primary laser light from the information recording medium is injected and a third surface from which return path light is emitted to the integrated device side.

Again it is preferable that in this optical pickup the primary laser light has a wavelength longer than that of the secondary laser light, moreover has power capable of recording and that the laser light optical path separating elements separate the primary laser light regardless of the condition of polarization thereof.

Moreover, it is preferable for this optical pickup that the primary laser light has a wavelength of the 780 nm band and that the secondary laser light has a wavelength of the 650 nm band.

Further, it is preferable in this optical pickup that the primary laser light has a wavelength shorter than that of the secondary laser light, moreover has power capable of recording, and that the laser light optical path separating elements separate the primary laser light depending on the condition of polarization thereof.

Again, it is preferable in this optical pickup that the primary laser light has a wavelength of the 650 nm band and that the secondary laser light has a wavelength of the 780 nm band.

Moreover, it is preferable in this optical pickup that the primary laser light source and the integrated device are disposed physically separated from each other.

This optical pickup comprises a primary laser light source for emitting a primary laser light having a first wavelength and having sufficient power for recording, an integrated circuit further comprising a secondary laser light source for emitting a secondary laser light having a second wavelength that is longer than the first wavelength and having sufficient power for recording as well as light receiving means for receiving light of the primary and secondary laser lights, and laser light optical path separating elements that are a polarized light beam splitter further comprising a first surface into which the first laser light emitted from the primary laser light source is injected, that has polarization selectivity in respect of the primary laser light having the first wavelength and no polarization selectivity in respect of the secondary laser light having the second wavelength, a second surface from which the primary laser light is emitted to the information recording medium side and into which return path light of the primary laser light from the information recording medium side is injected and a third surface from which the return path light is emitted to the integrated device side.

This optical pickup device realizes adequate heat release of heat generated by the primary laser light source and has a simple structure as the secondary laser light source is integrated with the light receiving elements. Further, the optical axes of the primary and secondary laser lights are perfectly on the same axis in respect of the laser light optical path separating elements. Moreover, either of the primary laser light or the secondary laser light can be used for recording to an information recording medium. The primary laser light is structured having an optical system dependent on polarization, thereby realizing improved return path efficiency and the secondary laser light is structured having an optical system independent of polarization, such that good playout properties are maintained even in respect of a medium having substantial birefringence.

It is preferable that the laser light optical path separating elements of this optical pickup pass all primary laser light having P polarization in relation to the laser light optical path separating elements, while reflecting all primary laser light having S polarization and reflecting all of the secondary laser light regardless of the polarization thereof.

Further, it is preferable that the laser light optical path separating elements of this optical pickup pass all of the primary laser light having P polarization in relation to the laser light optical path separating elements, while reflecting all of the primary laser light having S polarization and passing all of the secondary laser light regardless of the polarization thereof.

Again, it is preferable that the polarized light beam splitter of this optical pickup operates in respect of the first wavelength only, such that the ratio of light passed depends on the polarization thereof, and passes from 10 percent to 30 percent of incident polarized light from the primary laser light source and passes from 20 percent to 60 percent of polarized light orthogonal thereto.

Moreover, it is preferable that the polarized light beam splitter of this optical pickup operates in respect of the first wavelength only, such that the ratio of light passed depends on the polarization thereof, and when the ratio of incident polarized light from the primary laser light source that is passed is $T_i$ and the ratio of polarized light orthogonal thereto that is passed is $T_v$, each pass ratio $T_i$ and $T_v$ should fulfill the conditions $10\% \leq T_i \leq 30\%$ and $T_v \leq 2T_i$.

Again, it is preferable that the laser light optical path separating elements of this optical pickup have a fourth surface that passes, from among the primary laser light, P polarized light components in relation to this polarized light beam splitter, moreover, passes from 5 percent to 20 percent of S polarized light components while reflecting the remainder, reflects all of the secondary laser light regardless of the direction of polarization thereof and emits from 5 percent to 20 percent of the primary laser light to light quantity detecting elements in the forward direction thereto.

Further, it is preferable that the laser light optical path separating elements of this optical pickup pass primary laser light emitted from the primary laser light source toward the information recording medium side and reflect return path light of the primary laser light from the information recording medium to the integrated device side, moreover, reflect secondary laser light from the secondary laser light source to the information recording medium side and reflect secondary laser light from the information recording medium to the integrated device side, and that the light receiving elements receive light that is return path light of the primary laser light or the secondary laser light from the information recording medium, emitted from the laser light optical path separating elements.

Moreover, it is preferable that the laser light optical path separating elements of the optical pickup function, in relation to wavelengths of the primary laser light, to pass P polarized light and to reflect S polarized light, and function, in relation to wavelengths of the secondary laser light, as a total light reflecting prism reflecting both P polarized light and S polarized light.

Further, it is preferable in this optical pickup, that the primary laser light source, the integrated device and the laser light optical path separating elements are disposed such that the optical axes connecting therebetween are positioned on the same plane, that the primary laser light source is disposed such that the direction of polarization of the primary laser light is parallel to that plane and that the secondary laser light source is disposed such that the direction of polarization of the secondary laser light is perpendicular to that plane.

Again, it is preferable in this optical pickup, that a collimator lens that collimates the primary laser light and the secondary laser light traveling from the laser light optical path separating elements to the objective lens is disposed between the laser light optical path separating elements and the objective lens.

Moreover, it is preferable that the laser light optical path separating elements of this optical pickup reflect the primary laser light emitted from the primary laser light source to the information recording medium side, pass return path light of the primary laser light from the information recording medium to the integrated device side, moreover pass secondary laser light from the secondary laser light source to the information recording medium side and pass return path light of the secondary laser light from the information recording medium to the integrated device side, and that the light receiving means receives return path light of the primary laser light source and the secondary laser light source from the information recording medium, emitted from the laser light optical path separating elements.

Further, it is preferable that the laser light optical path separating elements of the optical pickup function, in relation to wavelengths of the primary laser light, to reflect S polarized light and to pass P polarized light, and function, in relation to wavelengths of the secondary laser light, as a light passing member that passes both P polarized light and S polarized light.

Again, it is preferable in this optical pickup, that the primary laser light source, the integrated device and the laser light optical path separating elements are disposed such that the optical axes connecting therebetween are positioned on the same plane, that the primary laser light source is disposed such that the direction of polarization of the primary laser light is parallel to that plane at the position of incidence to the laser light optical path separating elements and that the secondary laser light source is disposed such that the direction of polarization of the secondary laser light is perpendicular to that plane at the position of incidence to the laser light optical path separating elements.

Moreover, it is preferable for this optical pickup that the primary laser light has a wavelength of the 650 nm band and that the secondary laser light has a wavelength of the 780 nm band.

Again, it is preferable in this optical pickup, that a first collimator lens that collimates the primary laser light from the primary laser light source is disposed between the primary laser light source and the laser light optical path separating elements and a second collimator lens that collimates the secondary laser light from the secondary laser light source is disposed between the integrated device and the laser light optical path separating elements.

Further, it is preferable that the laser light optical path separating elements of this optical pickup has an inclined surface that, in order to make the plane of incidence of a parallel light beam of the primary laser light made parallel by the first collimator lens into a circular form, is inclined in relation to the optical axis of that parallel light beam.

BRIEF DESCRIPTION OF THE DRAWINGS

FIG. 10 shows the structure of a PBS film surface having the wavelength reflection/transmission properties shown in FIG. 9;

FIG. 20 shows the structure of the PBS film surface having the characteristics shown in FIG. 19;

FIG. 24A and FIG. 24B are a design example having the structure of a PBS film surface of the polarized light beam splitter having the characteristics shown in FIG. 23;

FIG. 25A, FIG. 25B and FIG. 25C show the characteristics and another design example of a polarized light beam splitter being an optical pickup according to the fourth embodiment of the present invention;

FIG. 28A, FIG. 28B and FIG. 28C show the characteristics and a design embodiment of a polarized light beam splitter used for an optical pickup according to the sixth embodiment of the present invention;

FIG. 30A, FIG. 30B and FIG. 30C show the characteristics and a design embodiment of a prism used for an optical pickup according to the sixth embodiment of the present invention;

DETAILED DESCRIPTION OF THE INVENTION

Figure 1:
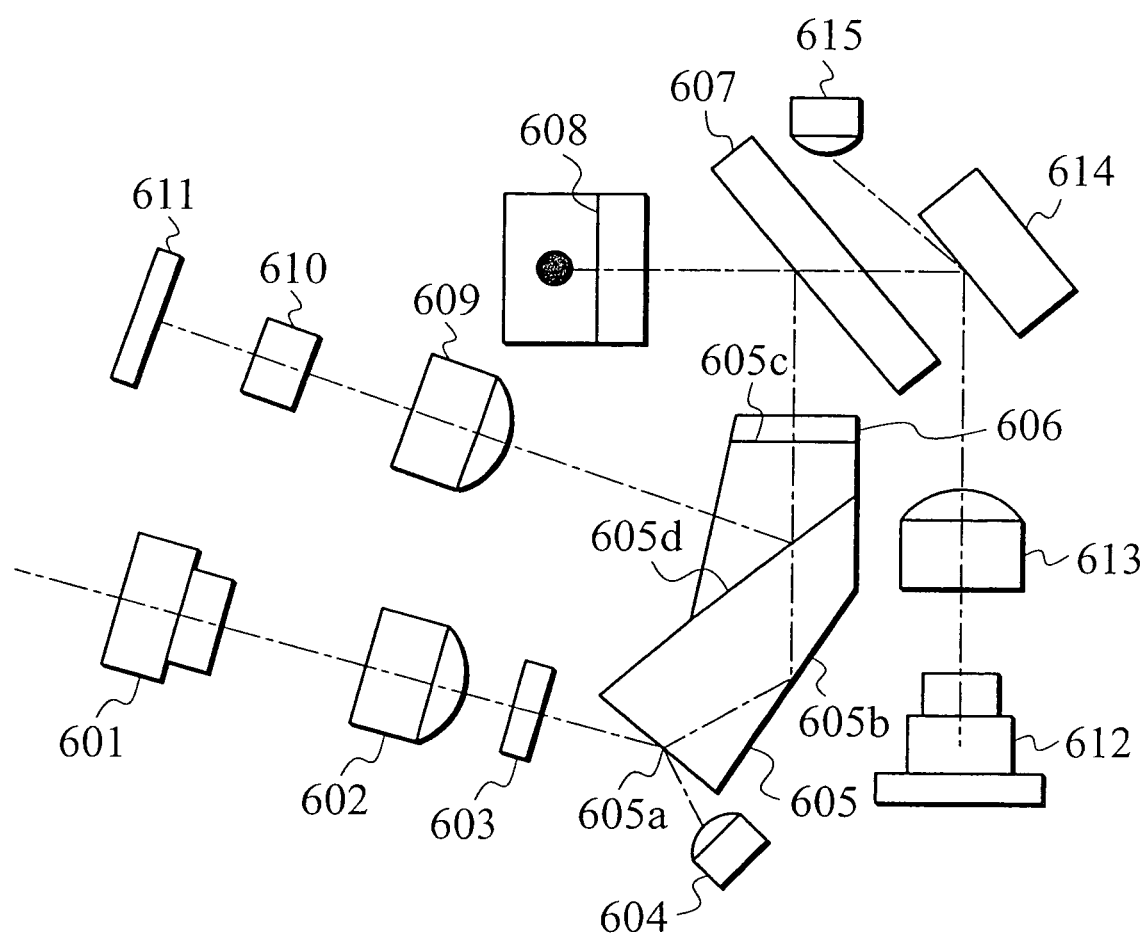
FIG. 1 is a schematic illustration showing an example of a conventional optical pickup.
Figure 2:
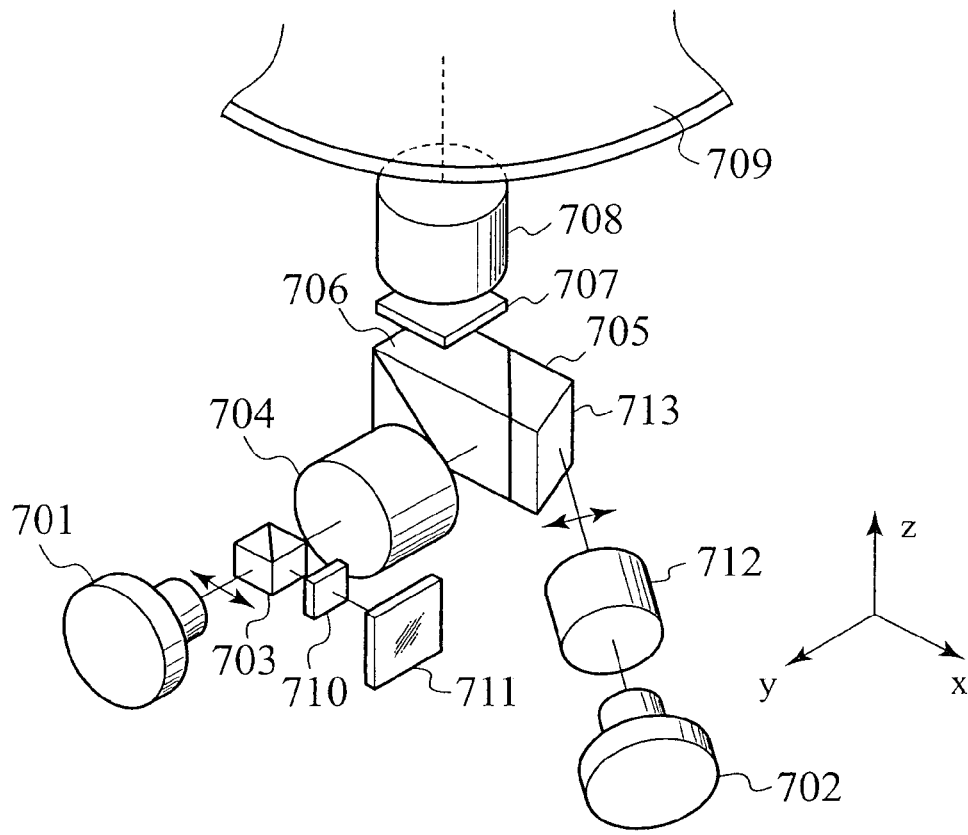
FIG. 2 is a schematic illustration showing another example of a conventional optical pickup.
Figure 3:
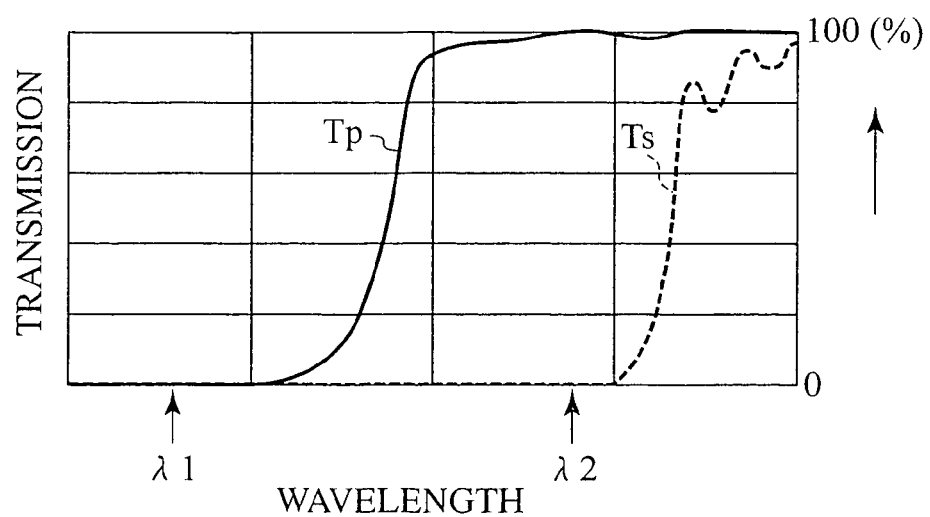
FIG. 3 is a graph showing the wavelength reflection/transmission properties in the polarized light beam splitter used in the optical pickup of FIG. 2.
Figure 4:
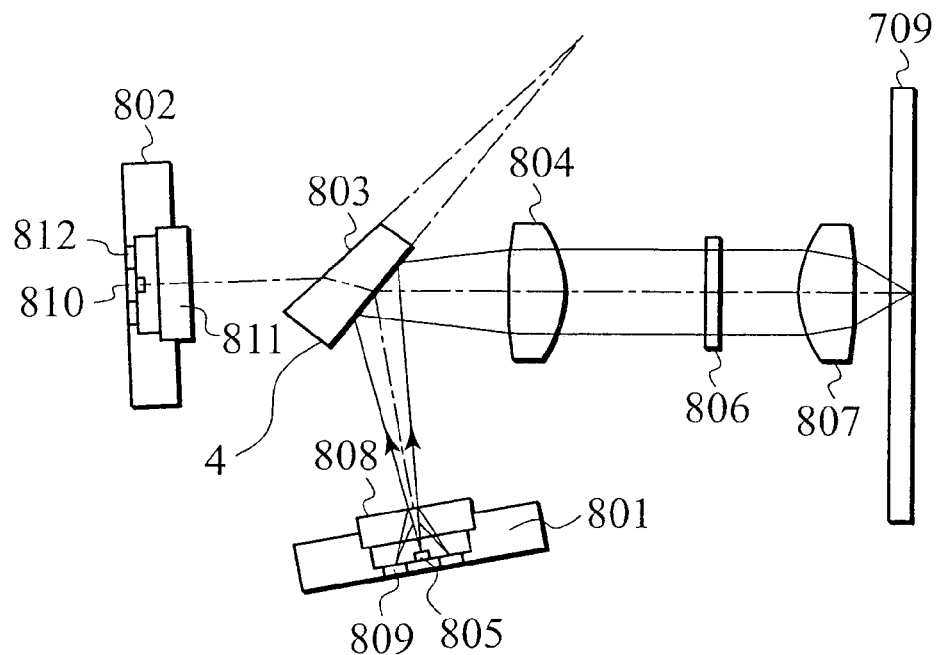
FIG. 4 is a schematic illustration of yet another conventional optical pickup.
Figure 5:
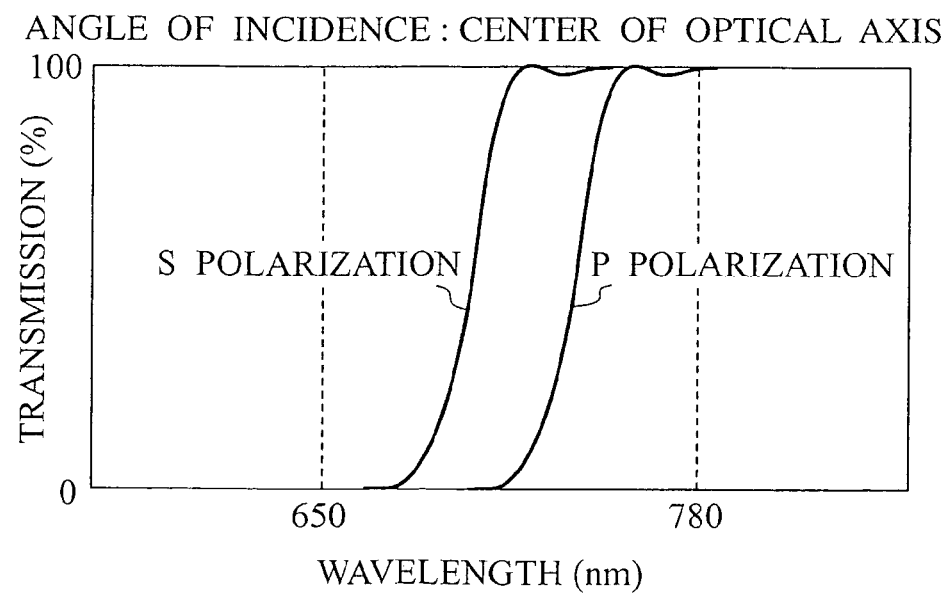
FIG. 5 is a graph showing wavelength reflection/transmission properties in the polarized light beam splitter used in the optical pickup of FIG. 4.

Exemplary embodiments of the invention will now be described below with reference to FIGS. 6 to 31. In these drawings, like reference numerals identify like elements.

Figure 6:
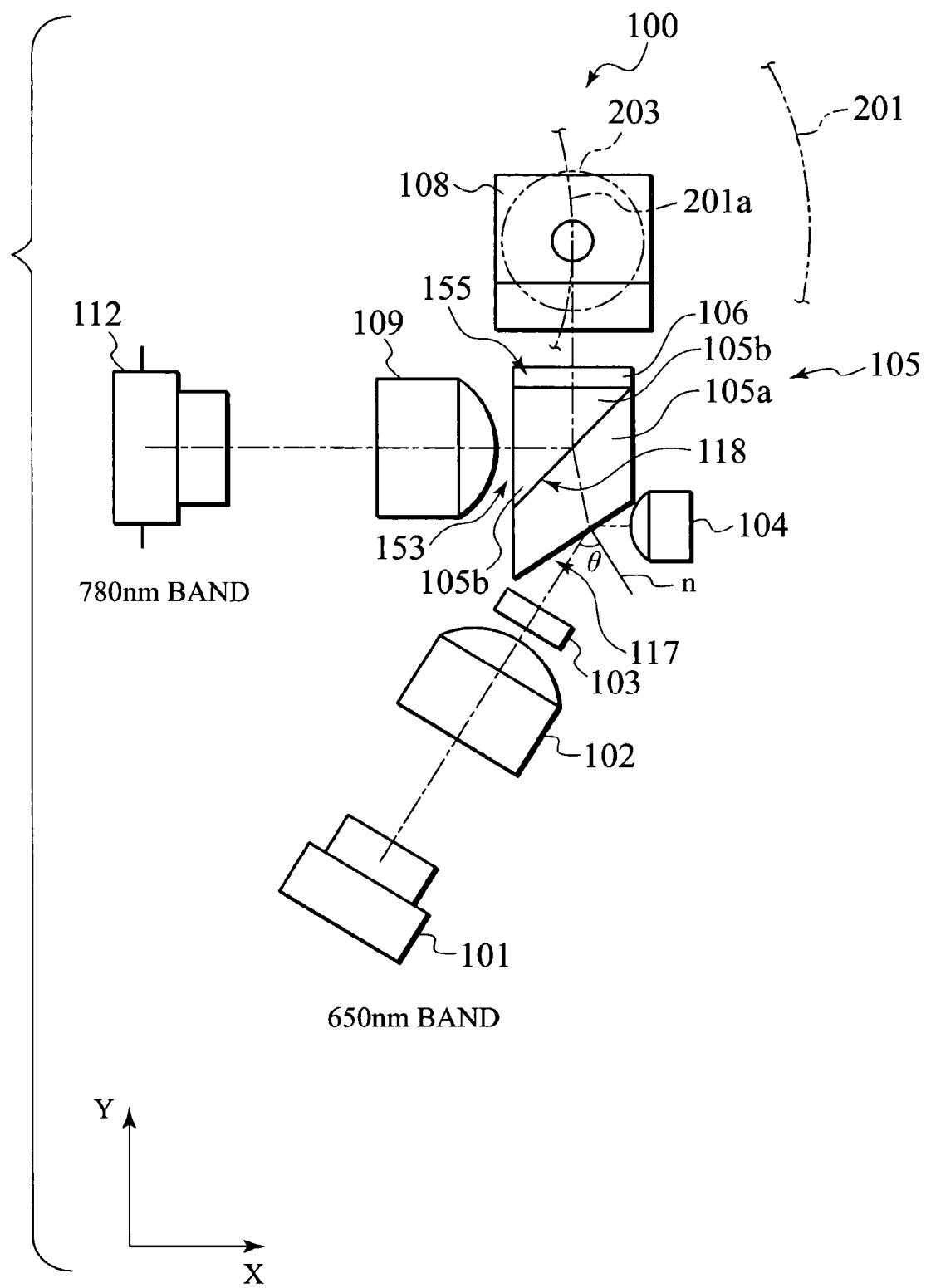
FIG. 6 is a schematic illustration of the structure of an optical pickup according to a first embodiment of the present invention.
Figure 7:
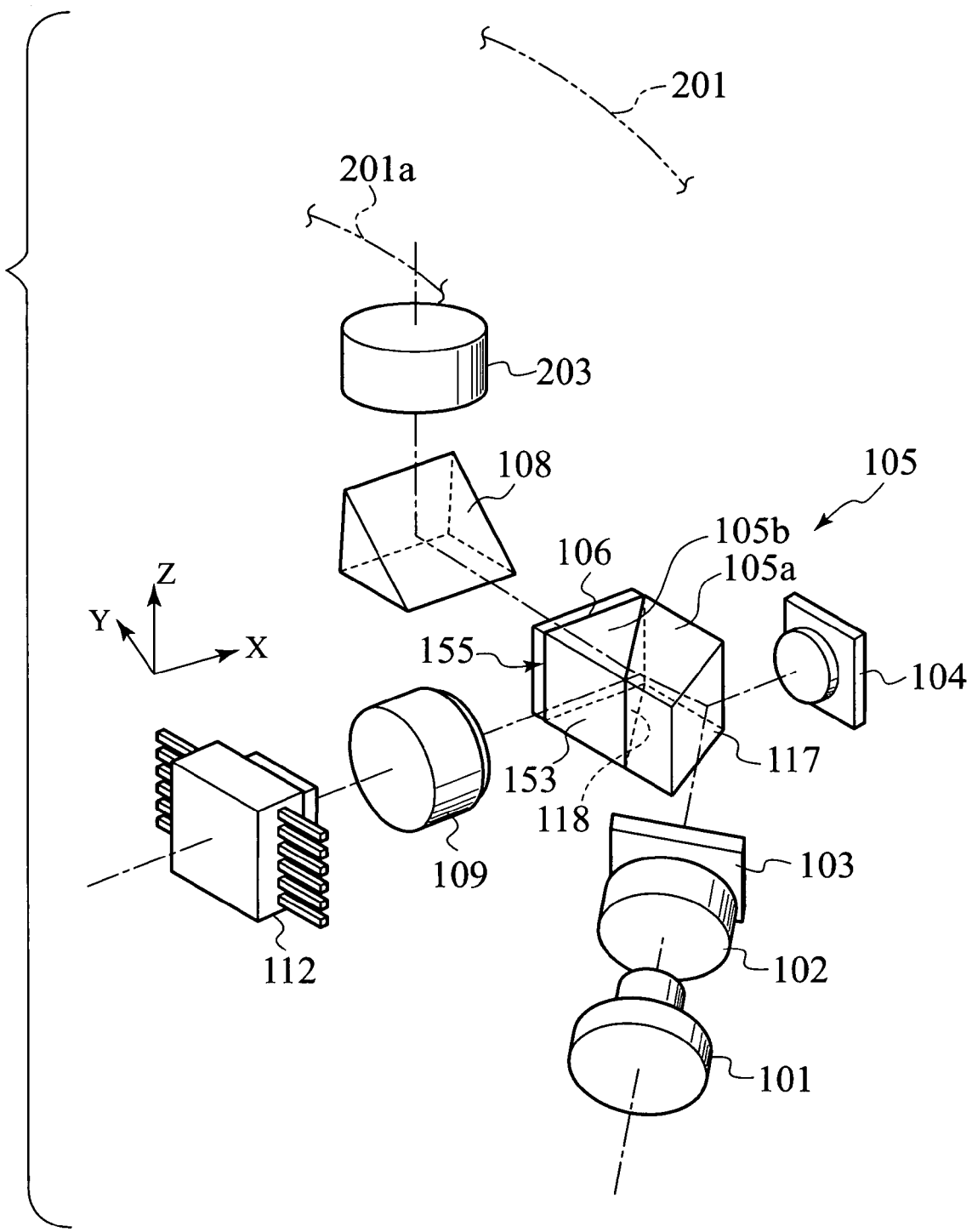
FIG. 7 is a perspective view of a schematic illustration of the structure shown in FIG. 6.

FIG. 6 and FIG. 7 are schematic illustrations of an optical pickup according to a first embodiment of the present invention.

As shown in FIG. 6 and FIG. 7 the optical pickup 100 according to this first embodiment comprises a primary laser light source 101 for emitting a primary laser light having a first wavelength and that is of sufficient power for recording, an integrated device 112 further comprising a secondary laser light source emitting a secondary laser light having a second wavelength that is longer than the first wavelength and that is of sufficient power for recording as well as light receiving means for receiving light from the primary and the secondary laser lights, and a polarized light beam splitter 105 further comprising an inclined surface 117 having light polarization selectivity in respect of the first laser light having the first wavelength, no light polarization selectivity in respect of the second laser light having the second wavelength and that is injected with the primary laser light emitted from the primary laser light source 101, a second surface 155 that emits the primary laser light to an information recording medium side 201 and is injected with return path light of the primary laser light from the information recording medium 201 and a third surface 153 for emitting the return path light to the integrated device side.

The laser light source 101 is for example a DVD laser light source emitting the primary laser light having output sufficient for recording (for example a laser light having a wavelength of the 650 nm band that is a wavelength used for DVD). The angle of rotation with respect to the optical axis of the primary laser light source 101 is set such that the direction of polarization of the primary laser light is P polarization in relation to the polarized light beam splitter 105 (that is to say the direction of polarization in a plane including the X and Y axes in the drawing). This primary laser light source can be obtained from a single laser source as from a laser diode in can package.

A primary collimator lens 102 and three beam generating means 103 are disposed between the primary laser light source 101 and the polarized light beam splitter 105.

The collimator lens 102 collimates (makes parallel) laser light from the primary laser light source 101.

The three beam generating means 103 generates three beams for detecting tracking errors on the optical disk 201 providing the information recording medium. This 103 is comprised for example of a grating.

The polarized light beam splitter 105 has for example a first prism 105a and a second prism 105b as shown in FIGS. 6 and 7.

The first prism 105a has a first inclined surface 117 that is injected with the primary laser light from the primary laser light source 101. The normal line n of the first inclined surface 117 is at an inclination in relation to the optical axis of the primary laser light in order to perform beam formation of the primary laser light. In this way the primary laser light having an elliptical shape cross-sectionally is formed into a round shape cross-sectionally (accordingly the first inclined surface 117 is called a beam forming surface or a cross-sectional form forming surface).

Figure 8:
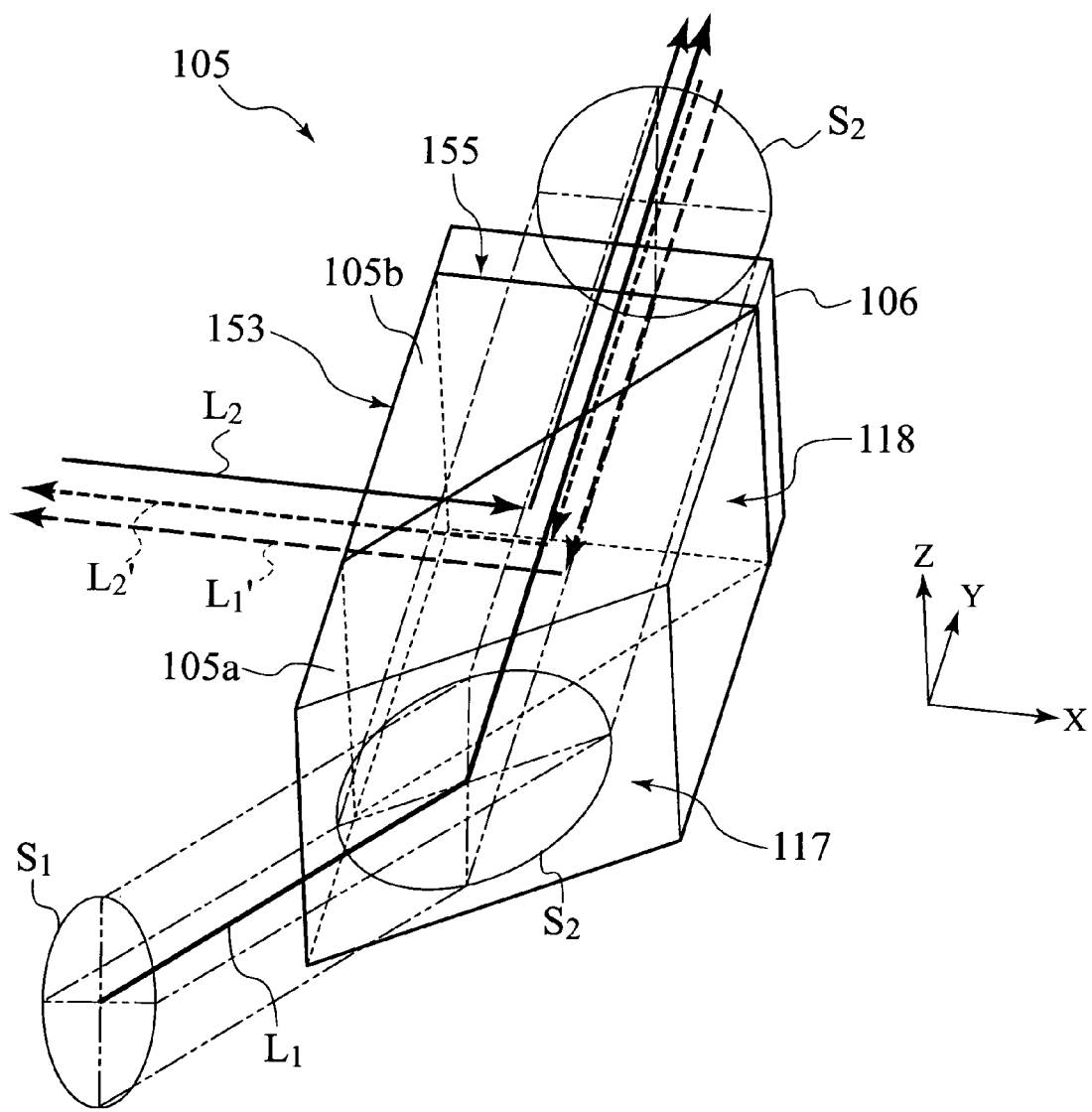
FIG. 8 is a schematic illustration of the structure of the polarized light beam splitter used for the first embodiment of the present invention.

FIG. 8 shows how the cross-sectional form of the primary laser light is formed by the first prism 105a.

More specifically, referring to FIG. 8, primary laser light L1 from the primary laser light source 101 that has an elliptical form cross-sectionally S1, immediately prior to entering the first prism 105a, is formed into a circular form cross-sectionally S2 by being injected into the inclined surface 117.

The angle of inclination of the normal line of the inclined surface 117 in relation to the optical axis of the primary laser light L1 is determined such that the projection of the cross-sectional form S1 to the inclined surface 117 is as cylindrical as possible.

In reference to FIG. 8, L1' shows return path light when the primary laser light L1 returns to the polarized light beam splitter 105 side after being directed to an optical disk 201. L2 shows the secondary laser light emitted from the secondary laser light source and L2' illustrates the return path light of this secondary laser light.

Referring again to FIGS. 6 and 7, the joining face between the first prism 105a and the second prism 105a is inclined at an angle of 45 degrees in relation to the Y axis in FIG. 6 (this Y axis being in a plane including the optical axis (Z axis) of an objective lens 203 described subsequently and the normal line of the mirror 108 and being perpendicular to the Z axis), and moreover is set parallel to the Z axis.

A polarized light beam splitter (PBS) film surface 118 is formed on the joining face. This PBS film surface 118 passes P polarized light from the primary laser light source and reflects S polarized light from the primary laser light source.

Figure 9:
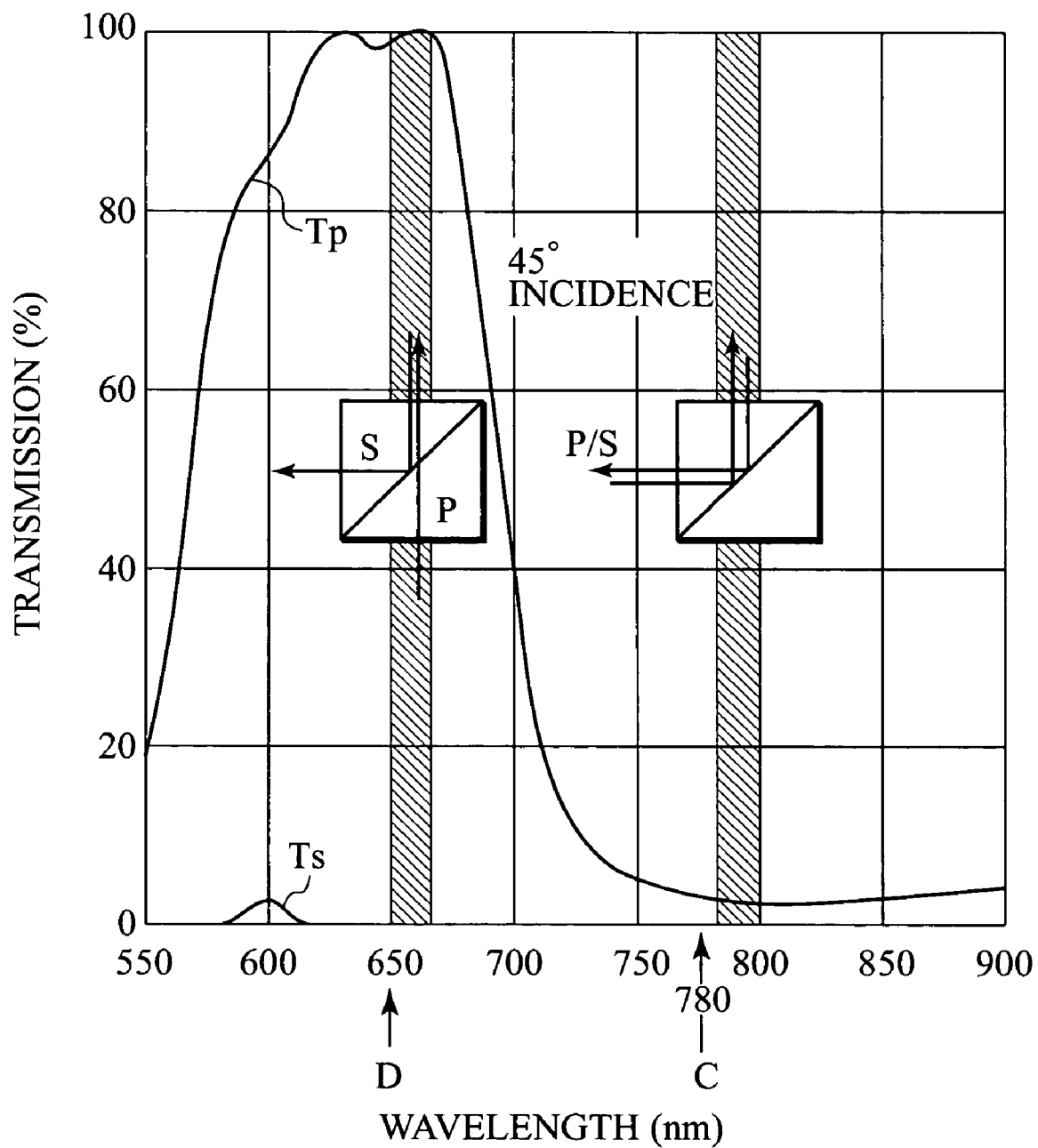
FIG. 9 shows wavelength reflection/transmission properties of the polarized light beam splitter shown in FIG. 8.

More specifically, FIG. 9 shows wavelength reflection/transmission properties of the PBS film surface 118.

In FIG. 9 the horizontal axis shows the wavelength of light and the vertical axis the ratio of light that is passed. The curved line $T_p$ indicates the ratio of P polarized light that is passed and the curved line $T_s$ represents the ratio of S polarized light that is passed.

As shown in FIG. 9, the P polarized light pass ratio $T_p$ is substantially 100 percent in the wavelength band of the primary laser light (the 650 nm wavelength region, and in the wavelength band of the secondary laser light (the 780 nm wavelength region) is substantially 0 percent. Further, the S polarized light pass ratio $T_s$ is substantially 0 percent (a rate of reflection close to 100 percent) in both the wavelength band region of the secondary laser light and of the primary laser light.

FIG. 10 shows the structure of a PBS film surface having the wavelength reflection/transmission properties described with reference to the explanation of FIG. 9, being a multi-layer film structure of eleven layers each sandwiched between glass material.

Here, SF57 indicates glass material by SHOTT AG corresponding to the primary and secondary prisms 105a and 105b. $Na_3AlF_6$ (cryolite) and $TiO_2$ (titanium oxide) are both well known film materials used in optics. Further, the refractive index is the refractive index in relation to 587.56 nm light and the thickness is expressed in nm.

$Na_5AL_3F_{14}$ (chiolite), a vapor deposited material having a refractive index equivalent to that of $Na_3AlF_6$ (nd=1.35), can be used instead. Further, $Ta_2O_5$ (tantalum pentoxide) can be used in substitution for TiO$_2$. Again, PBH53W or PBH55 can be substituted for the SF57.

In the above described structure, substantially 100 percent of primary laser light having P polarization passes the PBS film surface 118.

In other words, the PBS film surface 118 of the polarized light beam splitter 105 has polarized light selectivity in respect of primary laser light and non selectivity of polarized light in respect of the secondary laser light. That is to say, the polarized light beam splitter 105 passes P polarized light (first polarized light) of the primary laser light and reflects S polarized light (second polarized light) of the primary laser light, moreover, reflects the first and second polarized lights of the secondary laser light.

As shown in FIGS. 6 and 7, the optical pickup 100 has a first front monitor 104 positioned forward of the inclined surface 117, for detection of the power of the primary laser light. The output of the primary laser light that is output from the primary laser light source 101 can be controlled by the signal from this front monitor 104.

As shown in FIGS. 6 and 7, this optical pickup 100 also has a wavelength plate 106, mirror 108 and an objective lens 203 disposed between the polarized light beam splitter 105 and the information recording medium 201.

The wavelength plate 106 is set to function as a ¼ wavelength plate in relation to the wavelength (650 nm band region) of the primary laser light, thus primary laser light output from the second surface 155 of the second prism 105a is changed from P polarized light to circular polarized light.

The mirror 108 reflects laser light emitted from the wavelength plate 106 toward the information recording medium 201.

The objective lens 203 focuses the primary laser light having a parallel beam form from the mirror 108 over a track 201a (FIG. 7) of the information recording medium 201 and emits the reflected divergent light from the 201a to the mirror 108 side again as a parallel beam.

Figure 11:
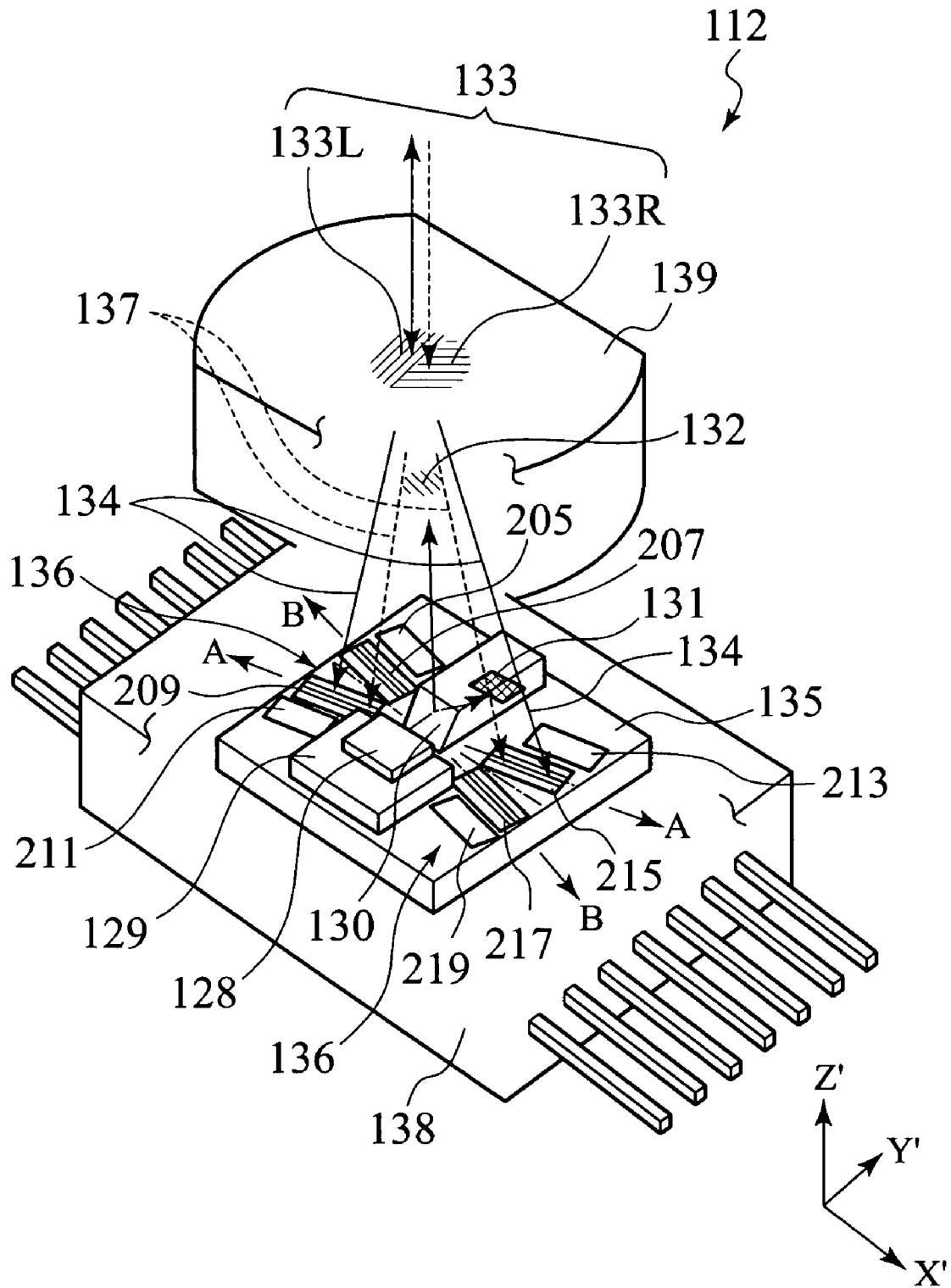
FIG. 11 is a schematic illustration showing in outline the structure of the integrated device providing the integrated device used for the first embodiment according to the present invention.

FIG. 11 shows the integrated device 112 in detail.

As shown in FIG. 11, the integrated device 112 has a secondary laser light source 128 that outputs secondary laser light (laser light having for example, a wavelength of the 780 nm band region used for CD) and light receiving means (light receiving elements) 136 for receiving light reflected from the information recording medium 201.

The secondary laser light source 128 emits laser light having a wavelength of for example the 780 nm wavelength region for the secondary laser light, which laser light is of sufficient power for recording.

As shown in FIG. 11, the secondary laser light source 128 is mounted on a cabinet 138 via a submount 129 and a light receiving elements base 135. Here, the secondary laser light source 128 is positioned on the light receiving elements base 135 such that return path light of the primary laser light and the secondary laser light is focused on the same position of the integrated device 112. In other words, the secondary laser light source 128 is set such that optical axes of the return path light of the primary laser light and the secondary laser light onto the light receiving elements 136 are mutually matched, or to explain it in yet another way, the secondary laser light source 128 is set such that the conjugation point of the light emitting point of the primary laser light and light emitting point of the secondary laser light are matching or positioned on the same optical axis. Conjugation point refers to the image point of the light emitting point of the primary laser light from the optical system including the inclined surface and the PBS film surface.

In the same way, the light receiving elements or light receiving means 136 is mounted on the light receiving elements base 135 via the cabinet 138.

Further, the integrated device 112 has a micromirror 130 that reflects secondary laser light emitted from the secondary laser light source 128 parallel to the planar surface of the light receiving elements base 135 (the Y' axial direction of FIG. 11) in a direction perpendicular to the planar surface of the light receiving elements base 135 (the Z' axial direction of FIG. 11).

Moreover, the integrated device 112 has a second laser light front monitor 131 for detecting a constant ratio of secondary laser light emitted from the secondary laser light source 128 and not reflected at the micromirror 130. The condition of the output and power of the secondary laser light emitted from the secondary laser light source 128 can be detected from this second laser light front monitor 131.

The integrated device 112 also has a grating 132 that separates the secondary laser light from the micromirror 130 into three beams and acts as a three beam generating means that generates three beams used for tracking error detection. This grating 132 can also be referred to as a three beam generating grating.

Again, the integrated device 112 provides hologram elements 133 for diffracting primary laser light and secondary laser light reflected from the information recording medium 201 to diffracted light of order of ±1, in order to detect focus errors or tracking errors of the primary laser light and secondary laser light on the information recording medium 201.

The hologram element 133 has a first region 133L and a second region 133R arranged such that light beams diffracted at the regions 133L and 133R have finite determined angle, respectively. Each of these regions 113L and 133R has a semi circle form of a circle divided into two.

In this way the diffracted light of order of ±1 of the primary laser light or the secondary laser light diffracted at the regions 133L and 133R font a pair of spots in the mutually disparate directions A and B (in a circle the center of which is a spot formed by 0 order diffracted light, the directions A and B toward different circumferential locations of that circle) over the plane X'Y' of FIG. 11.

Further as shown in FIG. 11, the light receiving elements 136 have a plurality of light receiving regions 205 to 219.

In FIG. 11, light beam 137 shows diffracted light of order of ±1 from the hologram elements 133L of the primary laser light and the light beam 134, that is diffracted light of order of ±1 from the hologram elements 133L of the secondary laser light. As shown in that drawing, according to this embodiment the diffracted light of order of ±1 of the primary laser light and the secondary laser light formed in the same hologram region (for example 133L) is designed so as to be injected into the same light receiving region (for example, 209, 215). In other words, the light receiving elements 136 have a first position light receiving region for receiving primary laser light having a order of refraction refracted in the hologram region and a second position light receiving region of the same light receiving region for receiving secondary laser light having the same order of refraction and moreover being refracted at that same hologram region.

As shown in FIG. 11, the three beam generating grating 132 and the hologram elements 133 form an integrated body as a somewhat circular structure over both surfaces of a member 139, having appropriate optical transmissive properties, that is disposed over the light receiving elements base 135.

Figure 12:
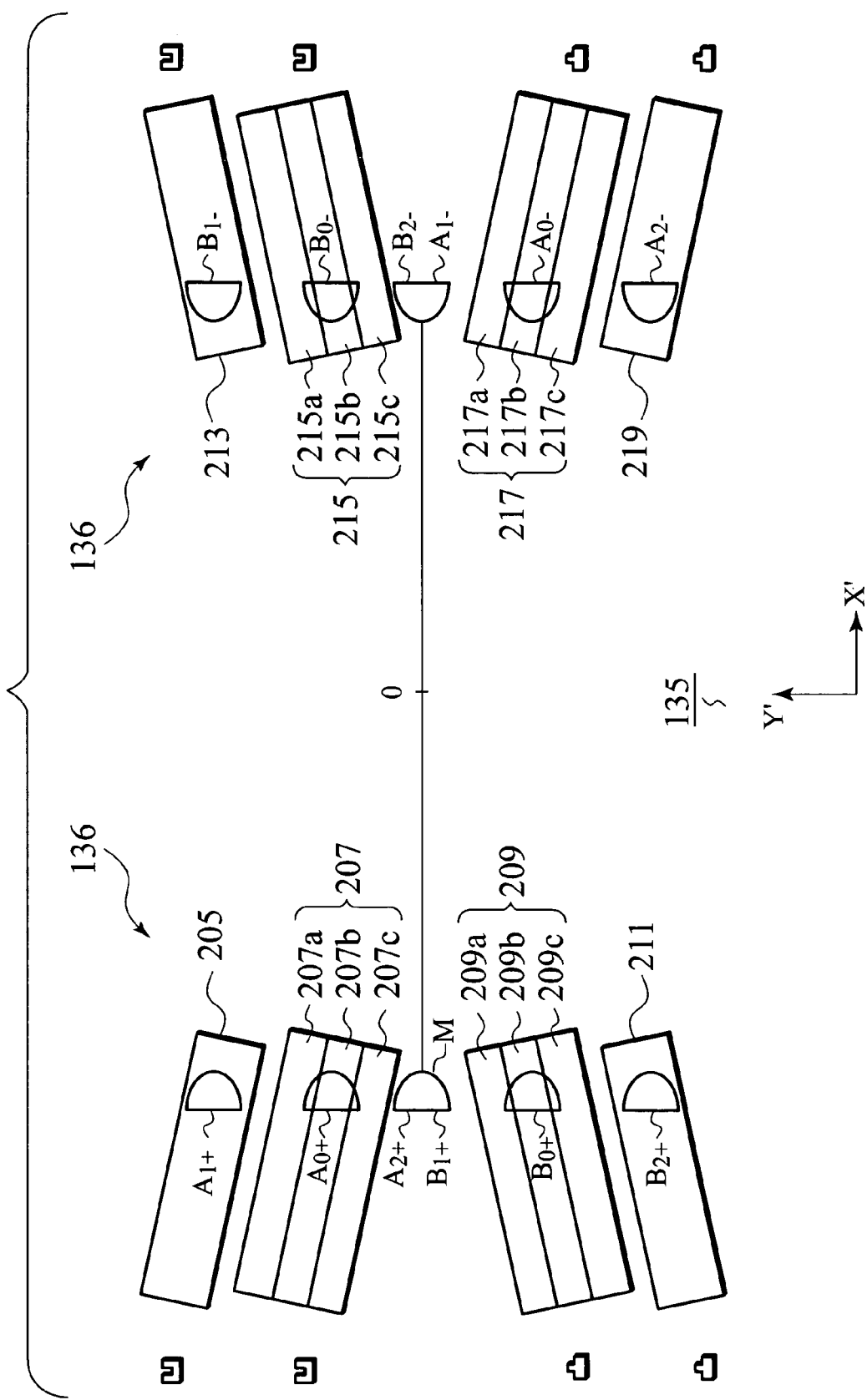
FIG. 12 is a schematic illustration showing in outline the structure of the light receiving elements disposed in the integrated device of FIG. 11.

FIG. 12 shows the spot of each refracted light formed over each of the light receiving regions 205 to 219 of the light receiving elements 136.

In FIG. 12 the semi circles A1±, A0±, A2±, B1±, B0±, B2± indicated over each of the light receiving regions 205–219 indicate the spot of diffracted light of order of ±1 from the hologram elements 133 for the three beams of return path light of the primary laser light for example. These three beams are formed as primary laser light from the primary laser light source 101 is separated into three beams by the three beam generating means 103 and each of these three beams is reflected at the optical disk. Specifically:

A1±: the spot of diffracted light of order of ±1 from the second region 133R of the first side beam from among the 3 beams A0±: the spot of diffracted light of order of ±1 from the second region 133R of the main beam from among the 3 beams A2±: the spot of diffracted light of order of ±1 from the second region 133R of the second side beam from among the 3 beams B1±: the spot of diffracted light of order of ±1 from the first region 133L of the first side beam from among the 3 beams B0±: the spot of diffracted light of order of ±1 from the first region 133L of the main beam from among the 3 beams B2±: the spot of diffracted light of order of ±1 from the first region 133L of the second side beam from among the 3 beams As shown in FIG. 12 according to this embodiment, spot A2+ and spot B1+ are designed so as to be concentrated between the light receiving regions 207 and 209 and spot A1− and spot and spot B2− are designed so as to be mutually concentrated between the light receiving regions 215 and 217.

Further, the first region 133R has lens power of a concave lens in respect of diffracted light of order of +1 and in respect of diffracted light of order of −1 has the lens power of a convex lens. The first region 133L on the other hand has lens power of a convex lens in respect of diffracted light of order of ±1 and in respect of diffracted light of order of −1 has the lens power of a concave lens.

According to the above configuration, DPP (Differential Push-Pull method) tracking error signals can be generated based on the output from the regions 205 to 219.

More specifically, tracking error signal $TE_{DPP}$ is derived as $$TE_{DPP} = ((V_{207} + V_{217}) - (V_{20} + V_{215})) - k((V_{205} + V_{219}) - (V_{213} + V_{211}))$$

Here, $V_{207}$ is the signal output from each region (for example, region 207).

Further, k is a determined constant determined by the separation ratio of the three beams. Here, k=0, in other words the tracking error signal $TE_{PP}$ as shown below is obtained using the push-pull method from just the main beam signal $V_{207}$, $V_{217}$, $V_{209}$, $V_{215}$.

$$TE_{PP} = (V_{207} + V_{217}) - (V_{209} + V_{215})$$

Further, a focus error signal can be generated based on the signals from region divisions 207a, 207b and 207c, and 217a, 217b and 217c of the regions 207 and 217.

More specifically, the focus error signal FE is obtained for example by $$FE = ((V_{207a} + V_{207c} + V_{217b}) + (V_{209b} + V_{215a} + V_{215c})) - ((V_{207b} + V_{217a} + V_{217c}) + (V_{209a} + V_{209c} + V_{215b}))$$

Here, $V_{207a}$ and the like, show the signal output for each region division (for example region 207a).

The hologram 133 and light receiving elements 136 are not restricted to those described above and other conventionally known configurations can be used in order to obtain the tracking error signal $TE_{DPP}$ and the focus error signal FE.

As shown in FIGS. 6 and 7 this optical pickup 100 further comprises a second collimator lens 109 for making parallel secondary laser light from the integrated device 112, disposed over the optical path between the integrated device 112 and the polarized light beam splitter 105.

Figure 13:
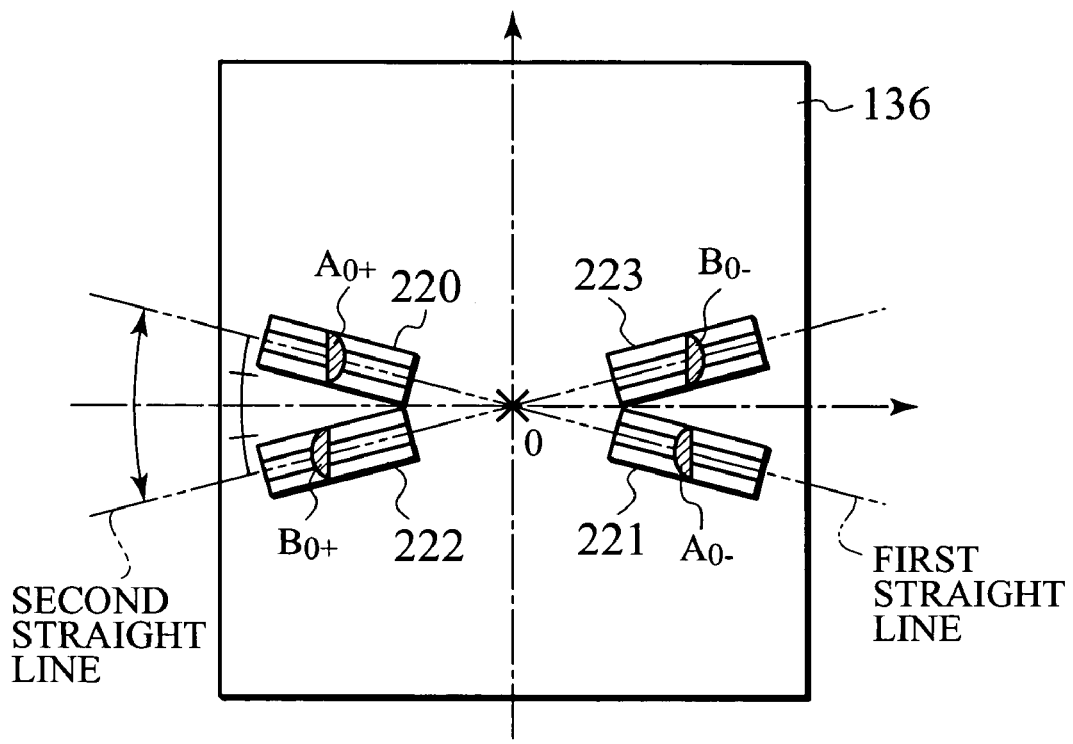
FIG. 13 is a schematic illustration showing in outline the structure of another embodiment of the light receiving elements disposed in the integrated device shown in FIG. 12.

FIG. 13 is a schematic illustration showing another embodiment of a method of forming light receiving regions of the light receiving elements 136.

The grating 132 is not used for this embodiment and for the light receiving elements 136, light receiving regions (the same as regions of light receiving elements) 220, 221, 222 and 223 are arranged in a positional relationship as shown in FIG. 13 for receiving light of the spots A0+ and A0− of diffracted light of order of ±1 diffracted by the second region 133R of the hologram elements 133 and the spots B0+, B0− of diffracted light of order of ±1 diffracted by the first region 133L.

The point of intersection of a first straight line passing through the center of the light receiving regions 220 and 221 and a second straight line passing through the center of the light receiving regions 222 and 223 is substantially at the optical axis 0, moreover, the four light receiving regions 220, 221, 222 and 223 are disposed on the light receiving elements 136 such that the angle of intersection (acute angle) of these two straight lines is below 20 degrees and preferably below 12 degrees.

According to this embodiment, secondary laser light emitted from a secondary laser light source 128 passes hologram elements 133 and is focused on optical disk 1. This focused light is modulated in coordination to information recorded in the recording tracks and is reflected along the same route as that traveled when emitted towards the optical disk 1. The optical axis of this reflected light is 0, a direction perpendicular to the page surface. Passing an optical system such as an objective lens or the like, the reflected light is directed to the hologram elements 133.

As described previously, the hologram elements 133 are divided into a first region 133R and a second region 133L, thus light reflected at the second region 133R forms the beams A0+, A0− of diffracted light of order of ±1 which is incident to the light receiving regions 220 and 221 over the light receiving elements 136, and the light reflected at the first region 133L forms the beams B0+, B0− of diffracted light of order of ±1 is incident to the light receiving regions 222 and 223 over the light receiving elements 136.

Figure 14:
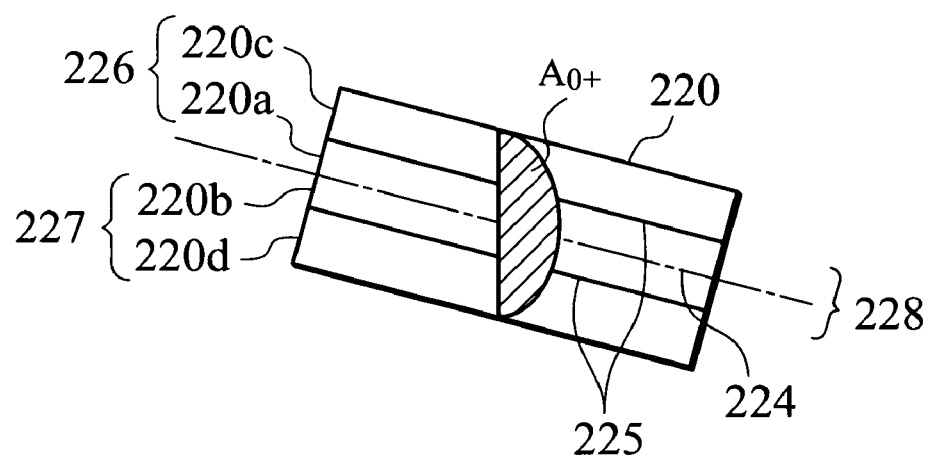
FIG. 14 is an expanded view of the light receiving region shown in FIG. 13.

FIG. 14 provides an expanded view of the light receiving region 220.

In FIG. 14, light receiving elements 220 are divided into four photoelectric exchange regions 220a, 220b, 220c and 220d by divisional lines 224 and 225, the divisional line 224 corresponding to the first straight line. The beam A0+ of order of +1 arising as light reflected at the region 133R of the hologram elements 133 is diffracted, is injected into the four regions 220a, 220b, 220c and 220d of the 220 in a half moon shape. The other light receiving elements 221, 222 and 223 are of the same structure and the corresponding light beams A0−, B0+ and B0− enter the respective light receiving regions in a half moon form.

Here, as the photoelectric exchange regions 220*a* and 220*c* together form photoelectric exchange region 226 and tile photoelectric exchange regions 220*b* and 220*d* together form photoelectric exchange region 227, the region of the light receiving regions 220, 221, 222 and 223 are each divided into two regions corresponding to the regions 226 and 227. The divisional line 224 dividing the light receiving region 220 into two faces the divisional line of the hologram elements 133 at generally a right-angled direction, such that reflected light is divided into four and received by the two regions 133R and 133L of the hologram and the photoelectric exchange regions 226 and 227 dividing each of the light receiving regions into two.

However, as the divisional line 224 dividing into two is not at a precise right angle in relation to the divisional line of the hologram elements 133, a portion somewhat displaced arises from what would be the ideal light beam division by tile DPD method in each region. Thus, according to this embodiment there is a degree of shift, however regardless, the condition for the DPD method that a light beam is divided into four is satisfied.

Returning to FIG. 14, if the photoelectric exchange regions 220*a* and 220*b* on the part inside the light receiving region 220 are combined forming the single light receiving region 228 each of the light receiving regions 220, 221, 222 and 223 are divided into three by the photoelectric exchange region 228 and the photoelectric exchange regions 220*c* and 220*d* on the outer sides. Thus, the required conditions of the SSD method are fulfilled in respect of either diffracted light of order of 1, however in order to use the SSD method for diffracted light of order of ±1, the light receiving region + used for diffracted light on the side of order of ±1 and the light receiving region − used for diffracted light on the side of order of −1, must be positioned so as to be at a substantially equal distance optically as the point of convergence of reflected light from the center point of the hologram elements 133 passed by the optical axis 0 of reflected light. In this embodiment the light receiving regions 220, 221, 222 and 223 are disposed over the light receiving elements 136 in order to fulfill these conditions, the hologram elements 133 having a lens effect to obtain this configuration.

Figure 15:
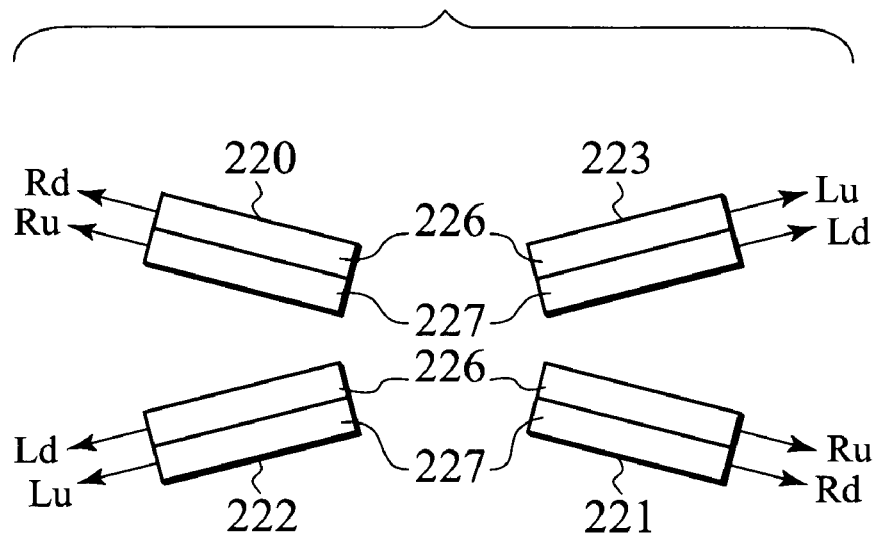
FIG. 15 is an explanatory drawing showing a method for acquiring a tracking error signal using the DPD method from four light receiving element regions of the light receiving region shown in FIG. 13.

FIG. 15 is an explanatory drawing illustrating how a tracking error signal is obtained from the four light receiving element regions 220, 221, 222 and 223 using the DPD method. Here, the photoelectric exchange signals obtained from the division into the two photoelectric exchange regions 226 and 227 of the light receiving elements region 220 are Rd and Ru, the photoelectric exchange signals obtained from the division into the two photoelectric exchange regions 226 and 227 of the light receiving elements region 221 are Ru and Rd, the photoelectric exchange signals obtained from the division into the two photoelectric exchange regions 226 and 227 of the light receiving elements region 222 are Ld and Lu and the photoelectric exchange signals obtained from the division into the two photoelectric exchange regions 226 and 227 of the light receiving elements region 223 are Lu and Ld.

The signal from diffracted light of order of ±1 is added first. In other words, by adding a signal of the same symbol as for example Ru+Ru=Ru, Ru, Rd, Lu and Ld are obtained. Next, phase is compared, $[(Ru+\Delta t)]+Ld$ and $[(Lu+\Delta t)]+Rd$, to obtain a tracking error signal. $\Delta t$ represents an error arising due to the displaced portion in ideal light beam division using the DPD method.

Figure 16:
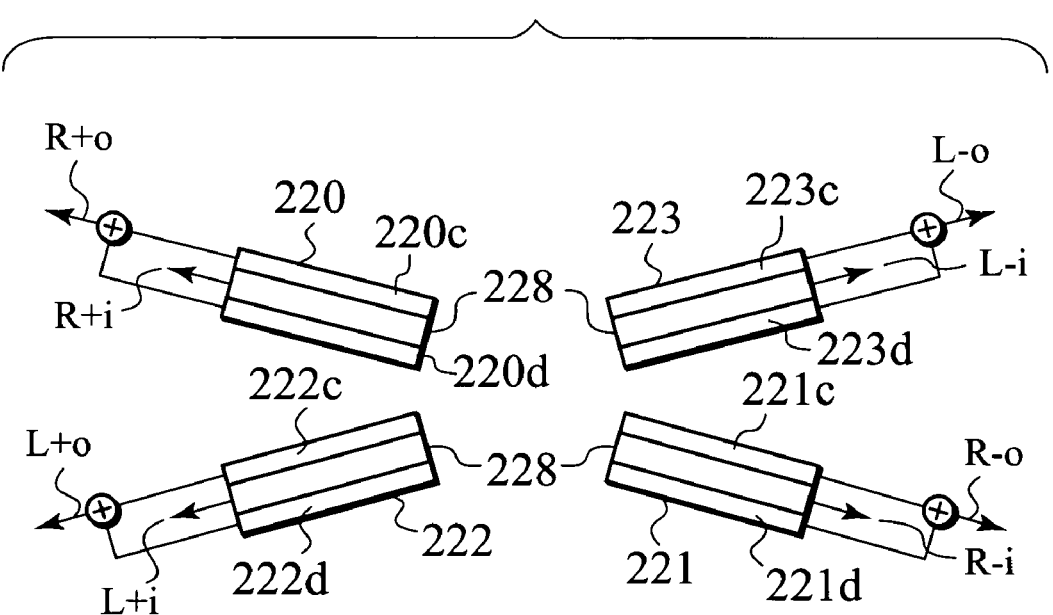
FIG. 16 is an explanatory drawing showing a method for acquiring a tracking error signal using the SSD method from four light receiving element regions of the light receiving region shown in FIG. 13.

FIG. 16 is an explanatory drawing illustrating how a tracking error signal is obtained from the four light receiving element regions 220, 221, 222 and 223 using the SSD method. Here, the photoelectric exchange signals obtained from the two photoelectric exchange regions 220*c* and 220*d* on the outer sides of the 220 are added to give $R_{+o}$, the photoelectric exchange signal obtained from the photoelectric exchange region 228 on the inner side is $R_{+i}$, the photoelectric exchange signals obtained from the two photoelectric exchange regions 221*c* and 221*d* of the outer sides of the 221 are added to give $R_{-o}$, the photoelectric exchange signal obtained from the photoelectric exchange region 228 on the inner side is $R_{-i}$, the photoelectric exchange signal obtained from the two photoelectric exchange regions 222*c* and 222*d* of the outer side of the 222 are added to give $L_{+o}$, the photoelectric exchange signal obtained from the photoelectric exchange region 228 on the inner side is $L_{+i}$, the photoelectric exchange signal obtained from the two photoelectric exchange regions 223*c* and 223*d* of the outer side of the 223 are added to give $L_{-o}$ and the photoelectric exchange signal obtained from the photoelectric exchange region 228 on the inner side is $L_{-i}$.

After determining the signal in this way a focus error signal is obtained from the following calculation.

$$[(L_{+i}-L_{+O})+(R_{+i}-R_{+O})]-[(L_{-i}-L_{-O})+(R_{-i}-R_{-O})]$$

As signals are obtained simultaneously from the four photoelectric exchange regions of each of the light receiving regions a tracking error signal illustrated by FIG. 15 and a focus error signal as illustrated by FIG. 16 are obtained simultaneously.

The operation of this embodiment will now be described.

As shown in FIGS. 6 and 7 primary laser light emitted from a primary laser light source 101 is made parallel at a first collimator lens 102 and the beam is divided into three at a grating 103 providing the three beam generating means. As described, the direction of the polarization of this primary laser light is set so as to be P polarized light in relation to the angle of incidence 117 of a polarized light beam splitter 105.

As shown in FIG. 8, each beam separated by the grating 103 enters the inclined surface 117 of the polarized light beam splitter 105, the cross-sectional form of which is substantially round. The primary laser light L1 in FIG. 8 indicates one of the beams from among those three beams.

Each of the beams formed at the inclined surface 117 enters the PBS film surface 118 at an angle of approximately 45 degrees.

As described previously, this PBS film surface 118 passes substantially 100 percent of P polarized light of the 650 nm band (FIG. 9). Accordingly, each of the three beams passes the PBS film surface 118 due to this 100 percent pass ratio, before entering the wavelength plate 106 from the second surface 155 of the polarized light beam splitter 105. As also described previously, this wavelength plate 106 operates as a ¼ wavelength plate in relation to the primary laser light.

Accordingly, each of the beams that enters the wavelength plate 106 is converted to circular polarized light by the wavelength plate 106 before being irradiated over the track 201*a* of the information recording medium 201 via the objective lens 203 and the mirror 108.

Return path light reflected at the track 201*a* passes via the objective lens 203 and the mirror 108 and again enters the wavelength plate 106. While the light reflected from the information recording medium 201 is termed return path light, light traveling towards the information recording medium 201 from the primary laser light source 101 can be termed outward path light (these same terms being applied in respect of all the embodiments).

Each of the return path lights is converted into S polarized light at the wavelength plate 106 and enters the second surface 155 of the polarized light beam splitter 105 along the Y axis (FIG. 8).

Each of the return path lights having entered the second surface 155 enters the PBS film surface 118, again at an angle of incidence of approximately 45 degrees.

As described previously, the PBS film surface 118 reflects S polarized light regardless of the wavelength (FIG. 9). Accordingly, each of the return path lights is reflected to the X axis by the PBS film surface 118, and its emitted from the third surface 153 of the polarized light beam splitter 105 before entering the second collimator lens 109.

Each of the return path lights that enters the second collimator lens 109 passes via the hologram elements 133 of the integrated device 112 and is focused to the light receiving regions 205 to 219 (FIG. 11).

DPP tracking error signals and focus error signals as well as read signals are generated from signals from the light receiving regions 205 to 219.

Secondary laser light emitted from the secondary laser light source 128 (FIG. 11) of the integrated device 112 is separated into three beams by the grating 132 for three beam generation.

Each of the beams separated at the three beam generating grating 132 enters the second collimator lens 109 and is made parallel.

Each of the collimated beams enters the third surface 153 of the polarized light beam splitter 105 along the X axis, before entering the PBS film surface 118 at an angle of incidence of approximately 45 degrees.

As described above, the PBS film surface 118 reflects substantially 100 percent of secondary laser light of the 780 nm band, regardless of the condition of polarization (FIG. 9). Accordingly, each beam is reflected at the PBS film surface 118 to the Y axial direction of FIG. 6 and FIG. 7.

Each of the beams reflected at the PBS film surface 118 is emitted from the second surface 155 and converted at the wavelength plate 106 to for example a suitable elliptical polarization.

Each of the beams converted at the wavelength plate 106 to a suitable elliptical polarization passes via the mirror 108 and the objective lens 203 and is focused on the track 201a over the information recording medium 201.

Return path light reflected at the track 201a passes via the objective lens 203 and the mirror 108 and enters the wavelength plate 106 where the light is converted again to for example a suitable substantially linear polarization (for example S polarization) or another elliptical polarization.

Each of the beams thus converted enters the second surface 155 of the polarized light beam splitter 105 along the Y axis and enters the PBS film surface 118 at an angle of incidence of approximately 45 degrees.

Each of the beams that enters the PBS film surface 118 is reflected in accordance with the reflective properties of the PBS film surface 118 (FIG. 9) to the X axial direction and is emitted from the third surface 153 of the polarized light beam splitter 105.

Each of the beams emitted from the third surface 153 is concentrated onto the hologram elements 133 after being formed into a convergent beam at the second collimator lens 109.

Each of the beams concentrated onto the hologram elements 133 are separated respectively into diffracted light of order of ±1 at the hologram regions 133L and 133R and form the respective spots on the light receiving regions 205 to 219.

As each spot is formed in the light receiving regions 205 to 219 tracking error signals, focus error signals and read signals are generated for the secondary laser light in the same manner as for the primary laser light, based on the output from each appropriate light receiving region 205 to 219.

Accordingly, this embodiment furnishes the following effects.

(1) The secondary laser light source 128 providing the source of output for the secondary laser light and the light receiving regions 205 to 219 providing a light receiving means for the primary and the secondary laser lights are integrated in one integrated device 112, and the light receiving regions 205 to 219 can receive light that is return path light of the primary and secondary laser lights.

(2) As the primary laser light source 101 is disposed so as to be separate from the integrated device 112 the structure can be realized with for example simply a single laser diode in can package and heat release and cooling can be performed easily.

(3) The wavelength plate 106 functions as a ¼ wavelength plate having ¼ wavelength differentiation in the 650 nm band but does not operate as a ¼ wavelength plate for the 780 nm band, such that light output from the wavelength plate 106 is of an elliptical polarization. Accordingly return path light of the secondary laser light is not polarized into a perfect linear polarization after passing the wavelength plate 106 and is an elliptical polarization being a mixture of P polarized light and S polarized light. As shown in FIG. 9 however, the PBS film surface 118 reflects all light of the 780 nm band regardless of the direction of polarization. Accordingly, substantially all return path light of secondary laser light returns to the integrated device 112 enabling the tracking error signals, focus error signals and read signals to be obtained from the appropriate light beam separation and calculation processes.

(4) As inside the integrated device 112 the conjugation point of the light emitting point of the primary laser light (the image point of that light emitting point from the optical system including the inclined surface and PBS film surface) and the light emitting point of the secondary laser light are set so as to be matching or positioned on the same optical axis, a position offset to a divisional line of the hologram elements 133, the objective lens 203 and a pupil substantially vanish, enabling satisfactory tracking error signals and focus error signals to be obtained.

(5) Light output can be easily controlled by the signal from the front monitor 104.

In the description of the above embodiment the primary laser light has a wavelength of the 650 nm band and the secondary laser light has a wavelength of the 780 nm band, however it is also suitable for the primary laser light to have a wavelength of the 400 nm band or the 780 nm band, moreover the secondary laser light may have a wavelength of the 650 nm band or the 400 nm band.

In this first embodiment the polarized light beam splitter 105 comprises the prisms 105a and 105b and the PBS film surface 118, however here, and in respect of subsequently described embodiments, the polarized light beam splitter 105 can be referred to as a prism.

Figure 17:
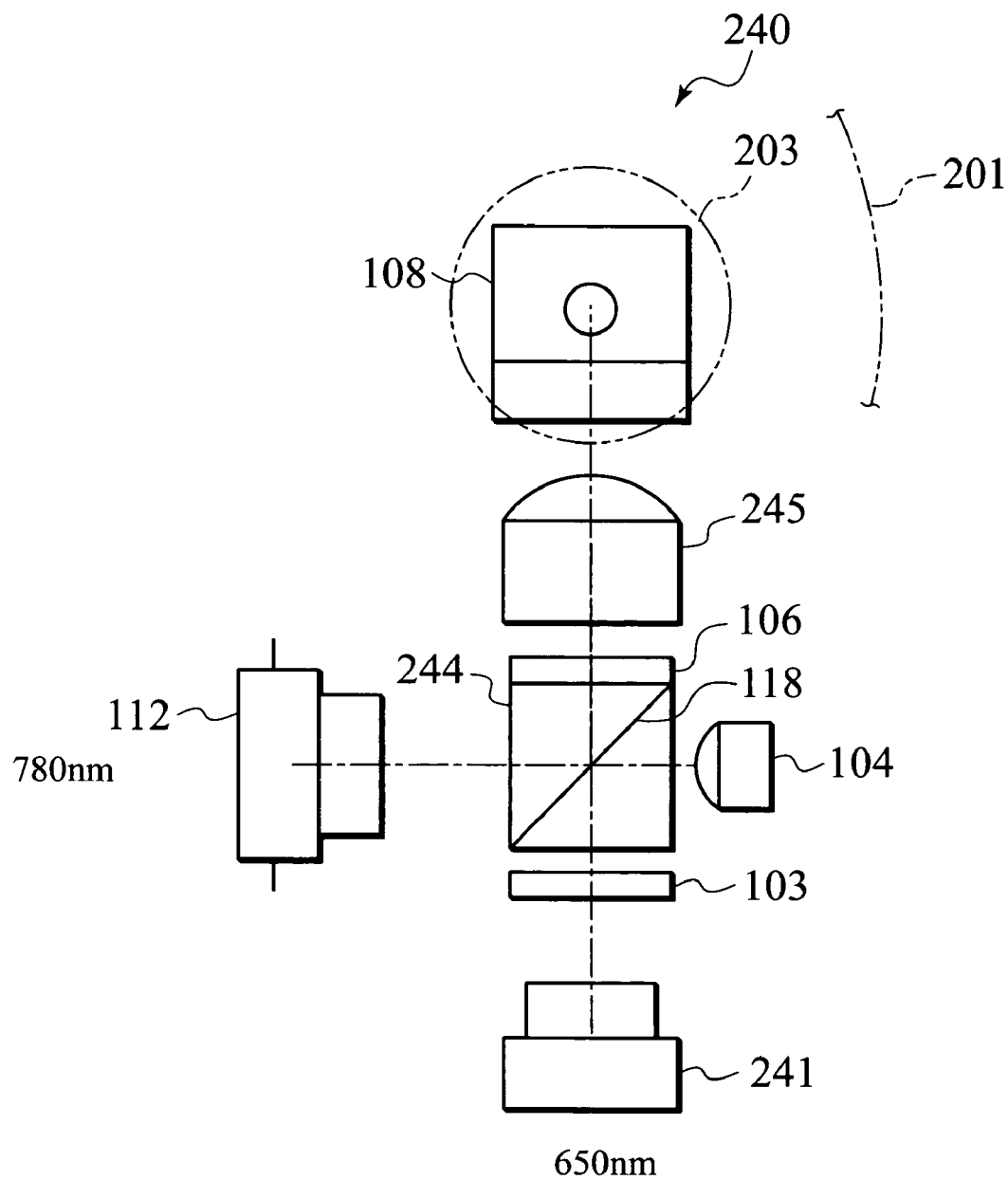
FIG. 17 is a schematic illustration of the structure of an optical pickup according to a second embodiment of the present invention.

FIG. 17 shows a schematic illustration of a second embodiment of an optical pickup according to the present intention.

In FIGS. 6 to 12 those elements having like reference numerals indicate those elements that are similar or the same as the respective elements of the first embodiment.

The optical pickup 240 of this second embodiment is of substantially the same configuration as the optical pickup according to the first embodiment.

That is to say, as shown in FIG. 17, this optical pickup comprises a primary laser light source 241 for emitting a primary laser light (wavelength of the 650 nm band) having sufficient power for recording, a polarized light beam splitter 244 including a polarized light beam splitting (PBS) film surface 118, and an integrated device 112 further comprising a secondary light source 128 (FIG. 11) for emitting a secondary laser light (having a wavelength of the 780 nm band) and having sufficient power for recording as well as light receiving means for receiving light from the primary and the secondary laser lights. Further, the PBS film surface 118 has the configuration as shown in Table 1 and the wavelength reflection/transmission properties as shown in FIG. 9.

The points of difference between the optical pickup according to the second embodiment and that according to the first are as follows.

(1) In comparison to the primary laser light source 101 of the first embodiment, the primary laser light source 241 has high-power output, or emits primary laser light that is close to perfectly circular, having a small aspect ratio of emitted light intensity distribution. Accordingly, beam formation is not required when recording to the optical disk 201 is performed using the primary laser light, and instead of the polarized light beam splitter 105 having an inclined surface 117 as in the case of the first embodiment, this second embodiment uses a polarized light beam splitter 244 having a cuboid form.

(2) The second embodiment uses a single collimator lens 245 instead of the two collimator lenses 102 and 109 used in the first embodiment. That is to say, the single collimator lens is used jointly for both the first and the second laser lights. As shown in the drawing, the collimator lens 245 is disposed between the polarized light beam splitter 244 and the objective lens 203.

This optical pickup according to the second embodiment has the same effects as the optical pickup of the first embodiment.

Further, the optical pickup of the second embodiment has a small and simple optical system in comparison to the optical pick up of the first embodiment.

Figure 18:
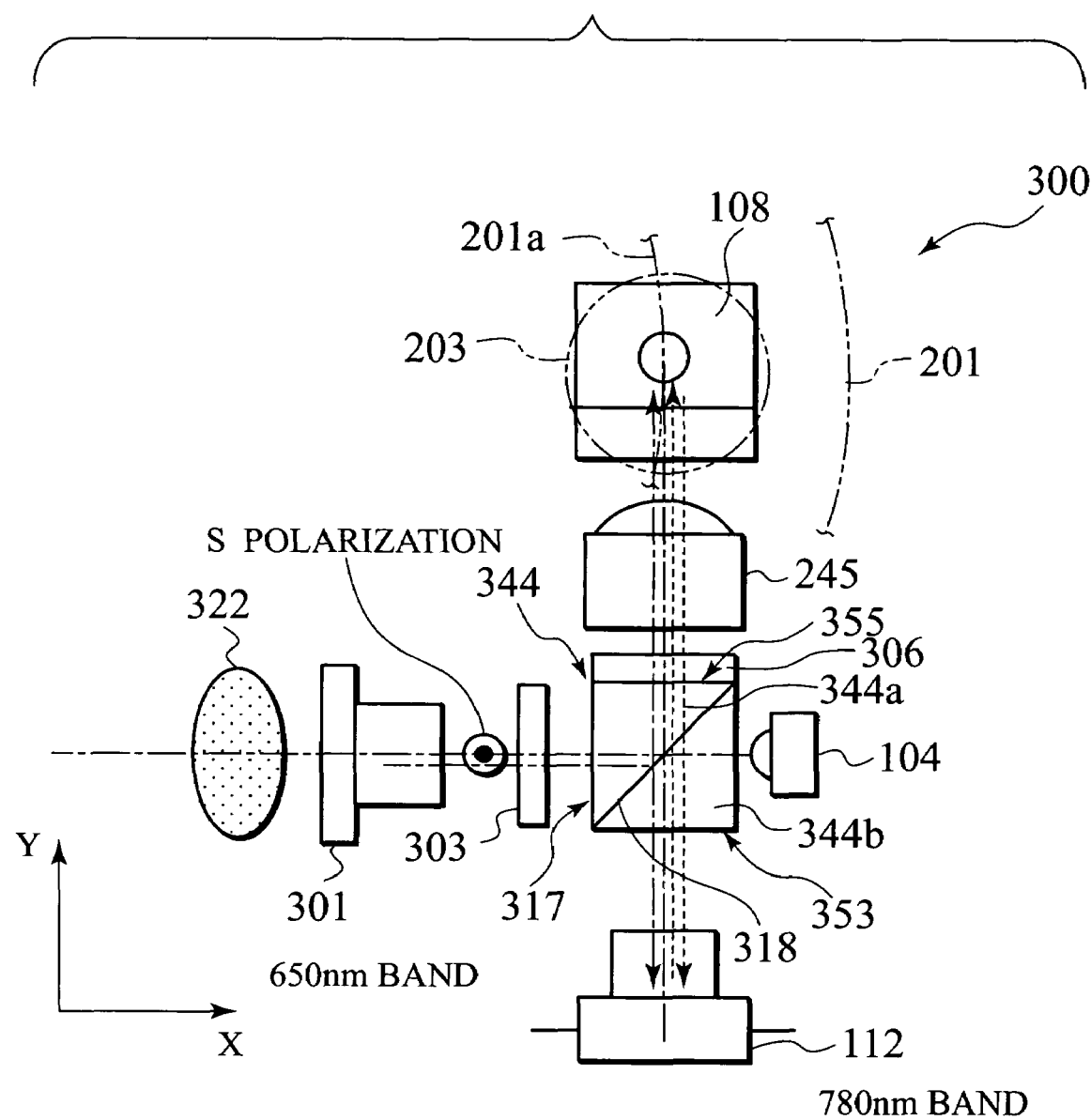
FIG. 18 is a schematic illustration of the structure of a third and a fourth embodiment according to the present invention.

FIG. 18 shows a schematic illustration of an optical pickup according to a third embodiment of the present invention.

Like reference numerals are applied for elements of this third embodiment that are the same as those of the first and second embodiments and a description of those elements is omitted.

The points of similarity between the optical pickup 300 of this third embodiment and the optical pickup of the second embodiment are as follows.

(1) The polarized light beam splitter 344 having a PBS film surface 318 is of a cubic form.

(2) The collimator lens 245 is disposed between the polarized light beam splitter 344 having the PBS film surface 318 and the mirror 108 so that the collimator lens 245 can be used for both the primary and secondary laser lights.

On the other hand, the points of difference between the optical pickup 300 of this third embodiment and the optical pickup of the second embodiment are as follows.

Figure 19:
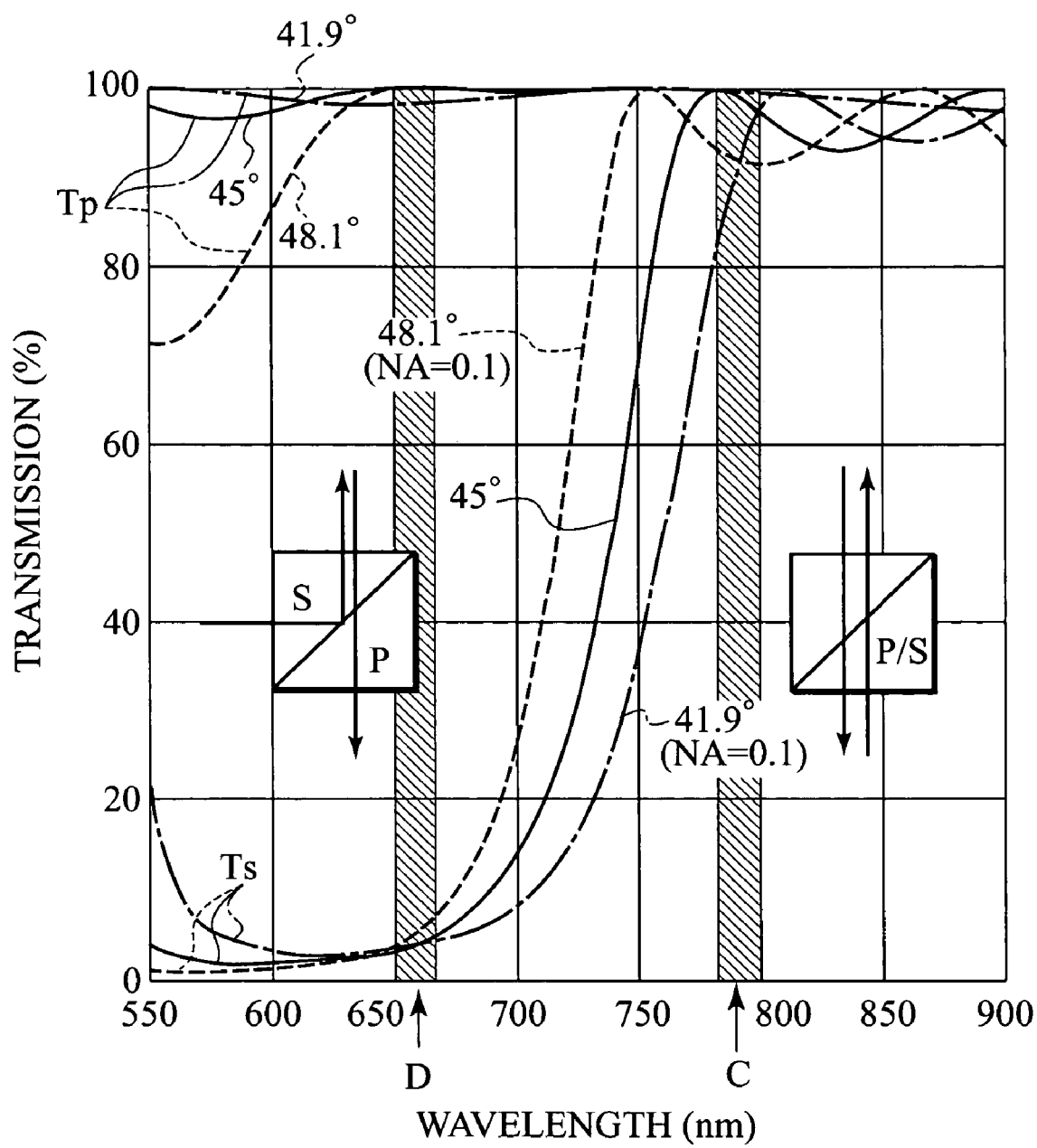
FIG. 19 shows wavelength reflection/transmission properties in the polarized light beam splitter disposed in the third embodiment of the present invention.

(1) The PBS film surface 118 has the wavelength reflection/transmission properties shown in FIG. 19.

(2) In view of the wavelength characteristics as shown in FIG. 12, the integrated device 112, having the secondary laser light source 128 and the light receiving elements 136, is disposed along the Y axial direction and opposing the collimator lens 245, the polarized light beam splitter 344 having the PBS film surface 318 being disposed therebetween. The primary laser light source 301 is disposed along the X axial direction, orthogonal to the Y axis.

More specifically, it is further described as follows.

As shown in FIG. 18, the optical pickup 300 comprises a primary laser light source 301 for emitting a primary laser light (wavelength of the 650 nm band) having sufficient power for recording, a polarized light beam splitter 344 including a polarized light beam splitting (PBS) film surface 318, and an integrated device 112 further comprising a secondary light source for emitting a secondary laser light (having a wavelength of the 780 nm band) and having sufficient power for recording as well as light receiving means for receiving light from the primary and the secondary laser lights.

The primary laser light source 301 is comprised for example of a DVD laser light source emitting the primary laser light, and sets the angle of rotation with respect to the light axis such that the direction of the polarization of the primary laser light is S polarization in relation to the polarized light beam splitter 344 (in other words, polarization of a direction orthogonal to the plane including the X axis and the Y axis in the drawing). The primary laser light source 301 can be a single laser source like what is known as a laser diode in can package as described above.

A three beam generating means 303 is disposed over the optical path between the primary laser light source 301 and the polarized light beam splitter 344. This three beam generating means 303 generates three beams for detecting tracking errors on the information recording medium 201 and is comprised for example of a grating.

The polarized light beam splitter 344 has for example a primary prism 344a and a secondary prism 344b, as shown in FIG. 18. The primary prism 344a has a first surface 317 into which primary laser light from the primary laser light source 301 enters.

The joining face between the primary prism 344a and the second prism 344b is inclined at an angle of 45 degrees in relation to the Y axis in FIG. 8 (the Y axis of FIGS. 6 to 8) and parallel to the optical axis of the objective lens 203.

A polarized light beam splitter (PBS) film surface 318 is formed on the joining face. This film surface 318 passes P polarized light from the primary laser light source and reflects S polarized light from the primary laser light source.

More specifically, FIG. 19 shows wavelength reflection/transmission properties of the PBS film surface 318.

In FIG. 19 the horizontal axis shows the wavelength of light and the vertical axis the ratio of light that is passed. The three curved lines $T_p$ indicate the ratio of the three incident light beams having P polarization that are passed. The numbers 48.1 degrees, 45 degrees and 41.9 degrees on the curved line $T_p$ indicate the respective angles of incidence of each light beam incident to the PBS film surface 318. The range of these angles of incidence 48.1 degrees to 41.9 degrees is equivalent in this embodiment to the range NA 0.1 of the collimator lens 245. In the same manner, the three curved lines $T_s$ indicate the ratio of the three injected light beams having S polarization that are passed. The meaning of the values 48.1 degrees, 45 degrees and 41.9 degrees on the respective curved lines $T_s$ is the same as the meaning of the values on the three curved lines $T_p$.

Accordingly, the PBS film surface 318 has the following wavelength transmission properties. The ratio of S polarized light of the 650 nm band (first polarization) passed is substantially 0 percent (a rate of reflection of approximately 100 percent). The ratio of S polarized light of the 780 nm band that is passed is approximately 100 percent. In respect of P polarized light (the second polarized light), substantially 100 percent of light in both of those wavelength bands is passed. This applies also with respect to parallel light and divergent light (for example a light beam the angle of incidence to the PBS film surface 318 of which is in the range of 48.1 degrees to 41.9 degrees).

FIG. 20 shows the structure of a PBS film surface having these wavelength reflection/transmission properties, being a multilayer film structure of eleven layers each sandwiched between glass materials.

Here, SF57 indicates glass material by SCHOTT AG corresponding to the primary and secondary prisms 344a and 1344b. $LaF_3$ and $TiO_2$ are each widely known film materials in the optical field. As shown in the drawing, the refractive index is the refractive index in relation to 587.56 nm light and the thickness is in units of nm.

As a substitute for SF57, PBH53W or PBH55 or the like can be used for the glass material.

In accordance with the above described configuration, substantially 100 percent of primary laser light from the primary laser light source 301 having S polarization is reflected at the PBS film surface 318 even when divergent light.

As shown in FIG. 18 this optical pickup 300 further provides a wavelength plate 306, a mirror 108 and an objective lens 203 disposed on the optical path between the polarized light beam splitter 344 and the information recording medium 201.

In the same manner as the previous embodiments, the wavelength plate 306 is set to function as a ¼ wavelength plate in respect of primary laser light of the 650 nm band. Accordingly, primary laser light emitted from the primary laser light source 301 is converted from S polarization to circular polarization at the wavelength plate 306.

The mirror 108 and objective lens 203 have the same operation and configuration as those described with respect to the first and second embodiments.

The operation of this third embodiment will now be described.

Primary laser light of S polarization from the primary laser light source 301 is emitted along the X axis.

This primary laser light has intensity distribution that in FIG. 18, extends longer in the parallel direction of the page and shorter in the direction orthogonal to the page, moreover, as this longer direction of the intensity distribution is equivalent to the radial direction orthogonal to a track on the information recording medium 201, this results in improved lens shift properties.

The primary laser light is separated into three beams by the three beam generating means 303.

Each beam thus separated enters the first surface 317 of the polarized light beam splitter 344.

Thereafter, each of these beams enters the PBS film surface 318 as divergent light centered on an angle of incidence of approximately 45 degrees.

As described above, the ratio of S polarized light of the 650 nm band that is passed at the PBS film surface 318 is substantially 100 percent (a pass ratio of 0 percent) even for divergent light (FIG. 19). Accordingly, this incident light is reflected along the Y axis at the 344 that has a reflection ratio of substantially 100 percent, and enters the ¼ wavelength plate 306 from the second surface 355 of the polarized light beam splitter 344.

Each beam that enters the ¼ wavelength plate 306 is converted into circular polarized light.

These beams of circular polarized light are then collimated at the collimator lens 245, and pass via the mirror 108 and the objective lens 203 before being directed on to the track 201a of the information recording medium 201.

Return path light reflected at the track 201a passes via the objective lens 203 and the mirror 108 and enters the collimator lens 245, wherein this light is formed into convergent light.

The return path light emitted from the collimator lens 245 enters the wavelength plate 306 and is converted into P polarized light before entering the second surface 355 of the polarized light beam splitter 344.

Each return path light of P polarization, that enters the second surface 355 enters as convergent light centered around an angle of incidence of 45 degrees to the PBS film surface 318.

As described above, in respect of P polarized light, regardless of the wavelength and irrespective of the angle of incidence within a determined range, the PBS film surface 318 passes the light (FIG. 19). Accordingly, each of these return path lights passes the PBS film surface 318 and is emitted from a third surface 353 of the polarized light beam splitter 344. As shown in the drawing, the normal line of the third surface 353 and the second surface 355 faces along the Y axial direction and the normal line of the first surface 317 along the X axial direction.

Each of the convergent light return path lights thus emitted from the third surface 353 passes via the hologram elements 133 (FIG. 11) of the integrated device 112 and enters the light receiving regions 205 to 219.

DPP tracking error signals, focus error signals and read signals are generated from the signals from the light receiving regions 205 to 219.

Secondary laser light output from the secondary laser light source 128 of the integrated device 112 (FIG. 11) is separated into three beams by the three beam generating means 132.

Each of the beams separated at the grating 132 enters the third surface 353 of the polarized light beam splitter 344 along the Y axis before entering the PBS film surface 318 as divergent light having an angle of incidence centered around 45 degrees.

As described above (FIG. 19), the PBS film surface 318 passes substantially 100 percent of secondary laser light of the 780 nm band from the secondary laser light source 128 regardless of the polarization. Further, these transmission characteristics of the PBS film surface 318 operate in respect of incident light having arbitrary angle of incidence within an determined range centered around 45 degrees to the PBS film surface 318.

Accordingly, each beam of the secondary laser light passes the PBS film surface 318.

Each said beam is then emitted from the second surface 355 before being converted at the wavelength plate 306 into for example, an appropriate elliptical polarization.

Each beam thus converted into an elliptical polarization at the wavelength plate 306 is then collimated at the collimator lens 245 and irradiated on to the track 201a on the information recording medium 201 after passing via the mirror 108 and the objective lens 203.

Return path light reflected at the track 201a passes via the objective lens 203 and the mirror 108 and enters the collimator lens 245 before being formed into convergent light. This convergent light enters the wavelength plate 306 and is converted there again into for example an appropriate substantially linear polarization or another elliptical polarization.

Each return path light thus converted enters the polarized light beam splitter 344 via the second surface 355, before passing the PBS film surface 344 and being emitted from the third surface 353.

Return path light emitted from the third surface 353 is directed over the hologram elements 133 (FIG. 11) where these lights are separated into respective diffracted lights of order of ±1 by the hologram regions 133L and 133R, and formed into respective spots on the light receiving regions 205 to 219.

After each spot is thus formed on the light receiving regions 205 to 219, tracking error signals, focus error signals and read signals are generated for the secondary laser light based on the output from each appropriate light receiving region 205 to 219.

Accordingly, this third embodiment furnishes the following effects in addition to the effects of the first and second embodiments.

(1) The PBS film surface 318 has polarization selectivity in respect of the primary laser light even when the primary and secondary laser lights are divergent light or convergent, but does not have polarization selectivity in respect of the secondary laser light. Accordingly, when the integrated device 112 is used, even if the collimator lens 245 is disposed between the mirror 108 and the polarized light beam splitter 344 that should be used in common for the primary laser light and the secondary laser light, high performance of the optical pickup can be maintained.

(2) As the primary laser light has intensity distribution 322 that extends longer in the direction parallel to the page surface in FIG. 18 and shorter in the direction orthogonal to that page surface and moreover is equivalent to the radial direction orthogonal to the track on the information recording medium 201, improved lens shift properties are realized.

A fourth embodiment of an optical pickup according to the present invention will now be described with reference to FIG. 18, FIG. 21A, FIG. 21B and FIG. 22. That is to say, an optical pickup according to this fourth embodiment has the same configuration as the above described optical pickup according to the third embodiment.

As shown in FIG. 18, the optical pickup according to this fourth embodiment has a primary laser light source 301. This primary laser light source 301 is a high output laser producing light of a wavelength of the 650 nm band. The primary laser light source 301 being a TE polarized light laser the direction of polarization of light emitted therefrom is the direction perpendicular to the page surface of FIG. 18 and the longer direction of the intensity distribution 322 is the direction parallel to that page surface (a radial reach direction).

As described above, primary laser light (in FIG. 18 indicated by alternate long and short dash line) emitted from the primary laser light source 301 is separated into three beams by a three beam generating means 303 (a grating), before being reflected at a 344. Passing the wavelength plate 306, this primary laser light is then collimated at a collimator lens 245. The primary laser light passes via a mirror 108 and an objective lens 203 and is directed to a track 201a on an optical disk 201.

The primary laser light reflected at the information recording medium 201 travels via the objective lens 203, the mirror 108, the collimator lens 245 and the wavelength plate 306 and then passes a polarized light beam splitter 344 before being received at the light receiving regions of an integrated device 112.

Secondary laser light emitted from the integrated device 112 (represented by the dotted line in FIG. 18) passes the polarized light beam splitter 344, travels via the wavelength plate 306 and enters the collimator lens 245 where the light is collimated. This secondary laser light travels via the mirror 108 and the objective lens 203 and is then irradiated on to the track 201a on the optical disk 201.

The secondary laser light reflected from the information recording medium 201 then travels via the objective lens 203, the mirror 108, the collimator lens 245 and the wavelength plate 306, before passing the polarized light beam splitter 344 and being received at the light receiving regions of the integrated device 112.

Figure 21A:
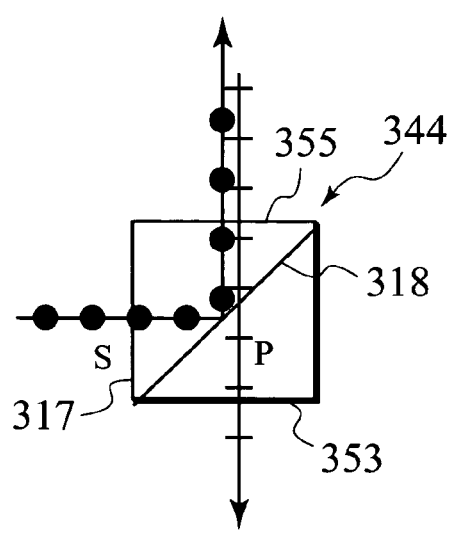
FIG. 21A and FIG. 21B show the behavior of laser light inside the polarized light beam splitter of the fourth embodiment of an optical pickup according to the present invention.
Figure 21B:
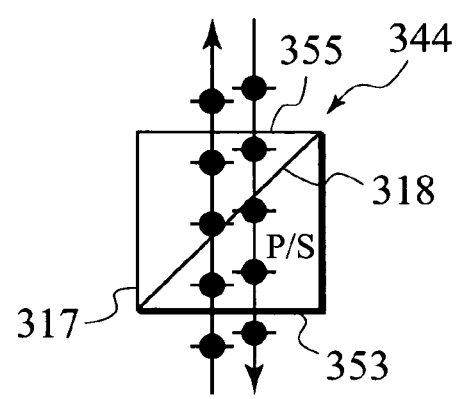

FIG. 21A and FIG. 21B show the behavior of laser light inside the polarized light beam splitter of the fourth embodiment of an optical pickup according to the present invention.

Figure 22:
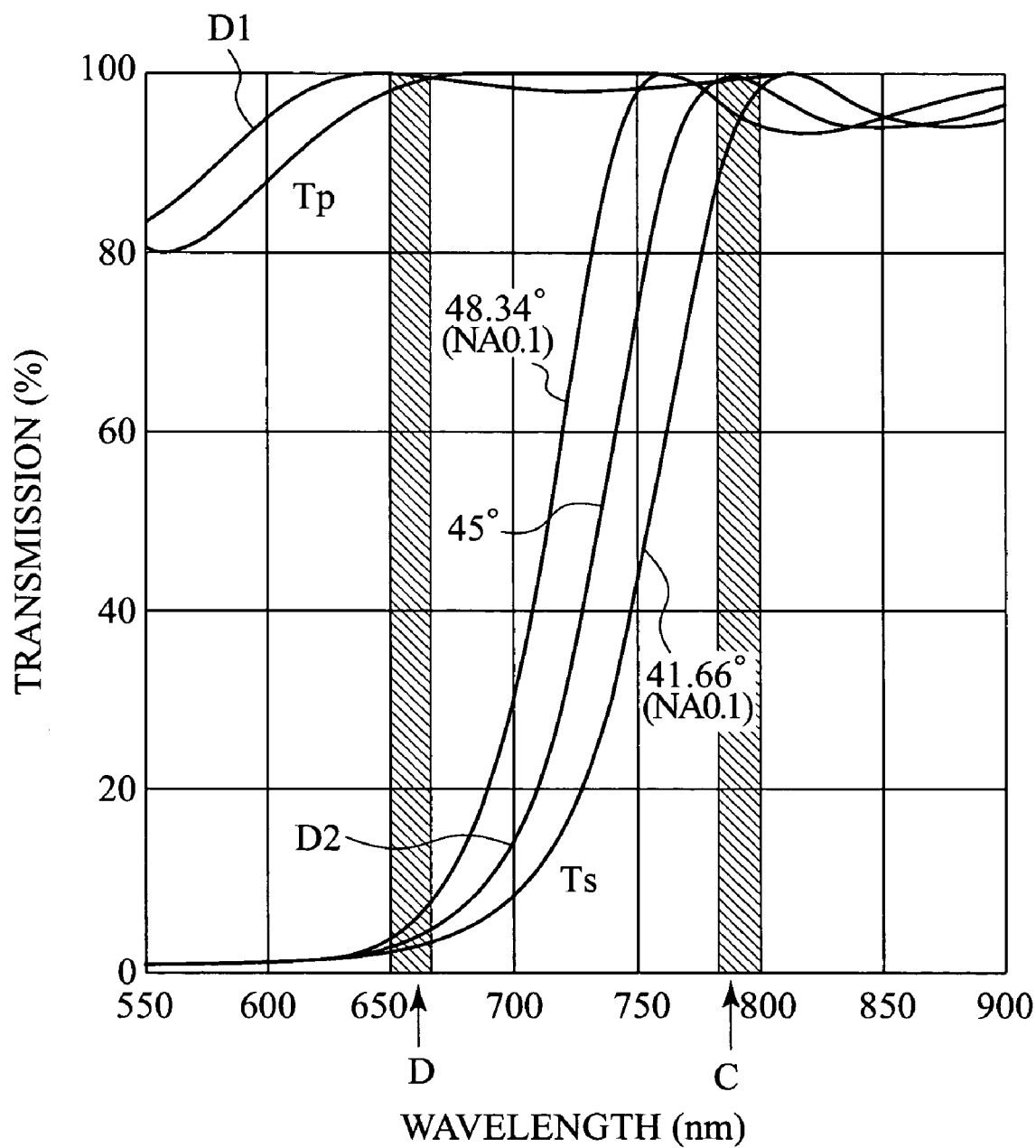
FIG. 22 is a graph showing wavelength reflection/transmission properties in a polarized light beam splitter used in an optical pickup according to the fourth embodiment of the present invention.

FIG. 22 is a graph showing wavelength reflection/transmission properties in the polarized light beam splitter 344 used in an optical pickup according to the fourth embodiment of the present invention.

Figure 23:
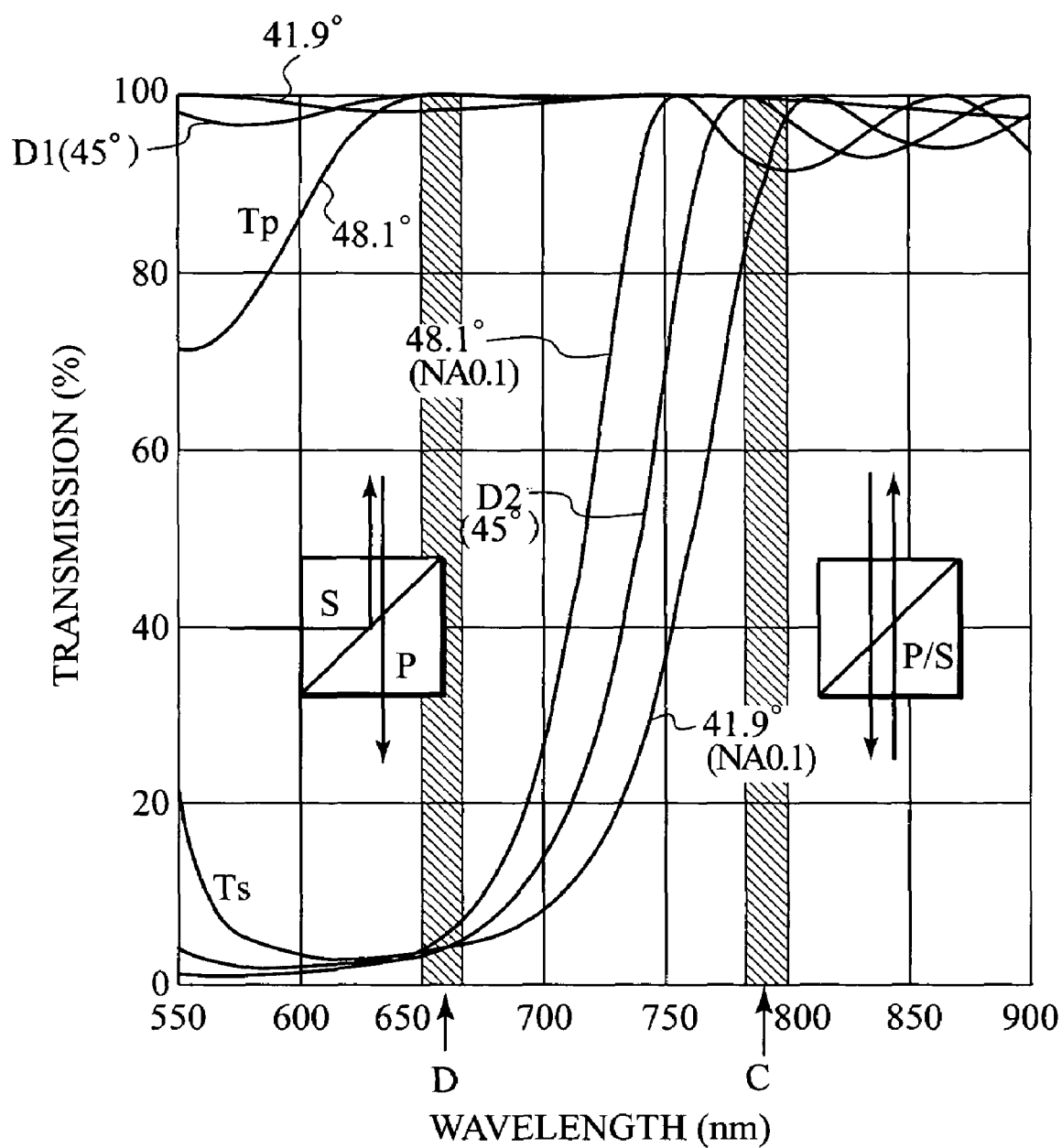
FIG. 23 is a graph showing wavelength reflection/transmission properties in another example of a polarized light beam splitter used in an optical pickup according to the fourth embodiment of the present invention.

FIG. 23 is a graph showing wavelength reflection/transmission properties in another example of the polarized light beam splitter 344 used in an optical pickup according to the fourth embodiment.

As described above, return path light of the primary laser light has polarization perpendicular to the page surface, as shown in FIG. 21. That is to say, this return path primary laser light is S polarized light in relation to the PBS film surface 318 of the polarized light beam splitter 344. Here, as shown in FIG. 22 and FIG. 23, the polarized light beam splitter 344 has the characteristics of a polarized light beam splitter in respect of light of the 650 nm band (d) as shown by d1 and d2, reflecting substantially 100 percent of S polarized light. Moreover, the wavelength plate 306 applies phase differential of λ/4 to light incident in the 650 nm band, emitting this primary laser light as circular polarized light.

The return path light of this primary laser light from the optical disk is made into light of an orthogonal polarity by the wavelength plate 306, in other words, P polarized light in relations to the PBS film surface 318 of the polarized light beam splitter 344. Substantially 100 percent of this P polarized primary laser light passes the PBS film surface 318, as shown in FIG. 21A (in accordance with the transmission characteristics as illustrated in FIG. 22 and FIG. 23). The collimator lens 245 operates as a detecting lens and this primary laser light is received by the twelve light receiving elements of the integrated device 112, undergoing photoelectric exchange before the signals are obtained.

As shown in FIG. 21B, light emitted from the second laser light source incorporated into the integrated device 112 is P polarized light in relation to the PBS film surface 318 of the polarized light beam splitter 344, substantially 100 percent of light of the 780 nm band (C) being passed in accordance with the characteristics of the prism as illustrated in FIG. 22 and FIG. 23, further this light is then passed at the wavelength plate 306.

The wavelength plate 306 has phase differentiation of λ/4 for the 650 nm band but this condition does not operate for the 780 nm band, the passed secondary laser light becoming circular polarized light. Accordingly, return path light of the secondary laser light is circular polarized light even after passing the wavelength plate 306 again and the P polarized light and S polarized light elements are mixed in relation to the PBS film surface 318.

However, as shown in FIGS. 22 and 23 regardless of whether the light is P polarized or S polarized, the PBS film surface 318 passes all light of the 780 nm band (C). Thus, the secondary laser light is subject to effectively no loss at the PBS film surface 318 and the return path light thereof returns to the integrated device 112 and undergoes photoelectric conversion in the same manner as the primary laser light, enabling the signals to be obtained.

In this way, the optical pickup according to this embodiment maintains outward path efficiency favorable for recording with an optical system dependent on polarization in respect of 650 nm band (DVD), while for 780 nm band (CD), an optical system independent of polarization operates.

Further, the primary laser light source 301 is a non integrated laser diode in can package laser wherein sufficient heat release is possible, moreover, the functions are integrated in the integrated device 112 operating for the three optical paths of (1) return path light of the primary laser light and (2) and (3), for the outward and return path lights of the secondary laser light.

In accordance with the optical pickup of the fourth embodiment, a configuration can be inexpensively realized in which even with a secondary laser light source having a low output, recording can be performed using only the primary laser light source (for DVD) such as for example in the case of a commonly used DVD recorder or the like. Here, the laser elements in the integrated device 112 are not high output which is disadvantageous for heat release from the integrated device 112, however there is no concern of deterioration of laser elements.

Further, in comparison to a laser diode in can package laser, the integrated device which also has a light receiving function is generally of a higher cost, therefore a configuration as used in this embodiment employing one integrated device and one laser diode in can package laser enables realization of a system that is clearly more inexpensive system in comparison to a configuration employing two integrated devices.

Further, this optical pickup does not require two laser chips disposed in mutual proximity, thereby providing more freedom in the positioning thereof such that the optical axes of laser lights of two wavelengths can be positioned on the same axis with no interval via the polarized light beam splitter 344. Thus, advantages are realized in the integrated device 112 as a position offset to the hologram divisional line, the objective lens and a pupil substantially vanish.

The light receiving function of the integrated device 112 operates, as described previously, with respect to two wavelengths, as via the same hologram elements light can be received satisfactorily and error detection can be performed using light receiving elements on the same plane. The applicant for this application has previously filed claims therefor in Japanese Patent Application Publication Laid-Open No. 2001-176119.

FIG. 24A and FIG. 24B are a design example having the structure of a PBS film surface of the polarized light beam splitter having the characteristics shown in FIG. 23.

This PBS film surface is an 11 layer multilayered construction interposed between glass materials. Here, SF57 indicates glass material by Schott AG equating to the first prism and the second prism forming the polarized light beam splitter. T indicates $TiO_2$ (titanium oxide) and F indicates $LaF_3$ (lanthanum fluoride). The refractive index is refractive index in relation to 587.56 nm light (line d) and thickness is in nm units.

$Ta_2O_5$ (Tantalum pentoxide) can be used in substitute for $TiO_2$ (titanium oxide). Moreover, PBH53W or PBH55W or the like can be used in substitute for the SF57.

Figure 25A:
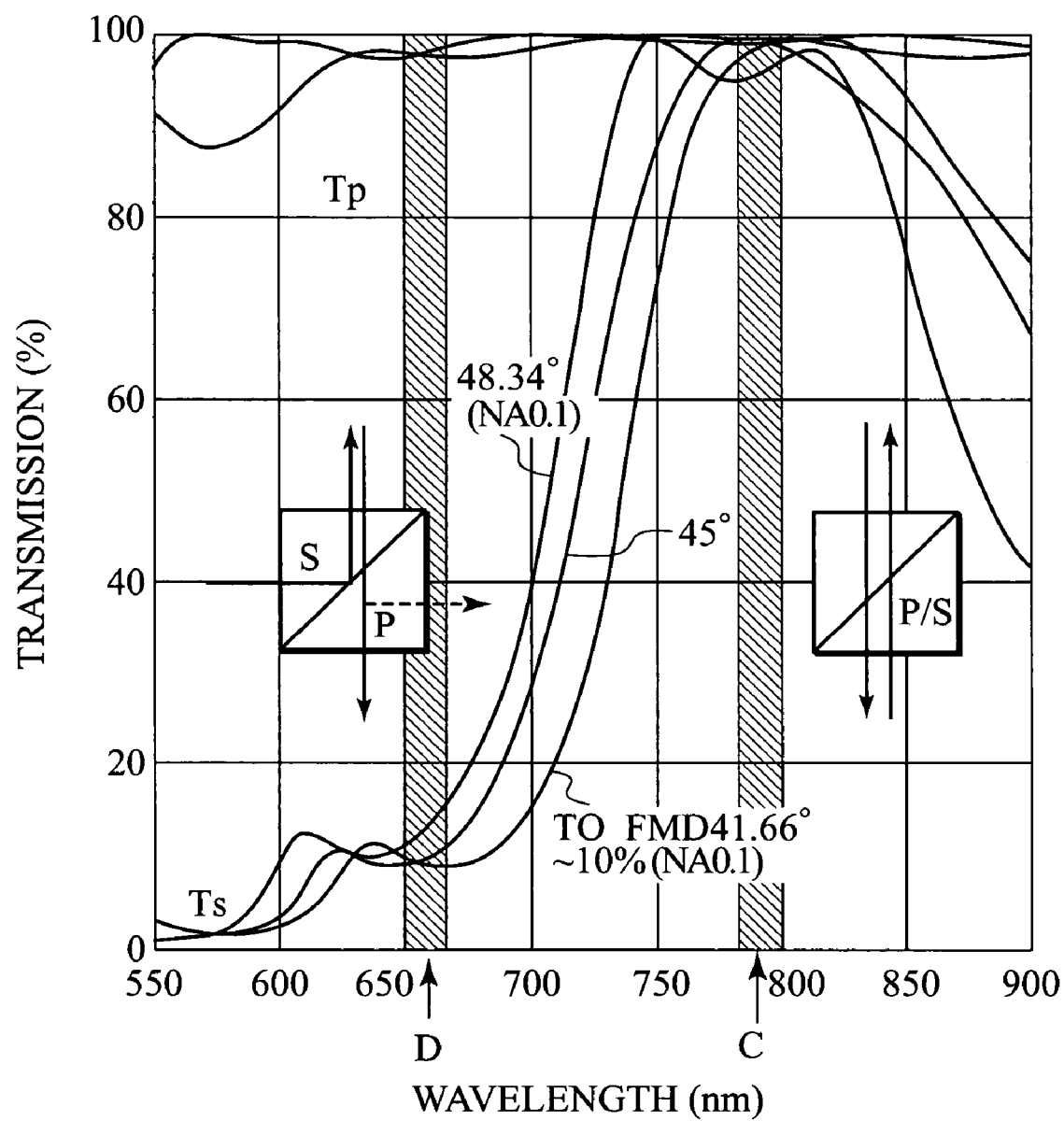

FIG. 25A, FIG. 25B and FIG. 25C show the characteristics and another design example of a polarized light beam splitter in an optical pickup according to the fourth embodiment of the present invention.

In this design example, the PBS film surface is formed of a nine layer multilayered structure interposed between glasses. Here, SF1 indicates glass material by {Schott Co. Ltd} equivalent to the first and second prisms comprising the polarized light beam splitter. T indicates $TiO_2$ (titanium oxide). The refractive index is refractive index in relation to 587.56 nm light (line d) and thickness is in nm units.

$Ta_2O_5$ (Tantalum pentoxide) can be used in substitute for $TiO_2$ (titanium oxide).

In this design example, the PBS film surface passes 10 percent of the primary laser light injected from the primary laser light source. The primary laser light passing the PBS film surface in this way is received at the front monitor 104 as shown in FIG. 18.

That is to say, generally difficulties arise when a rear monitor is used for a recording system employing high output laser, requiring that a front monitor is used. Because a constant ratio of light is passed at the PBS film surface and is received at the front monitor 104, APC (Automatic Output Control) can be performed. Here, an appropriate rate of return path light passed at the PBS film surface is 10 percent, and a range of between 5 percent and 20 percent is preferable when factoring in various conditions including wavelength and angle of beam radiation and the like.

Figure 26:
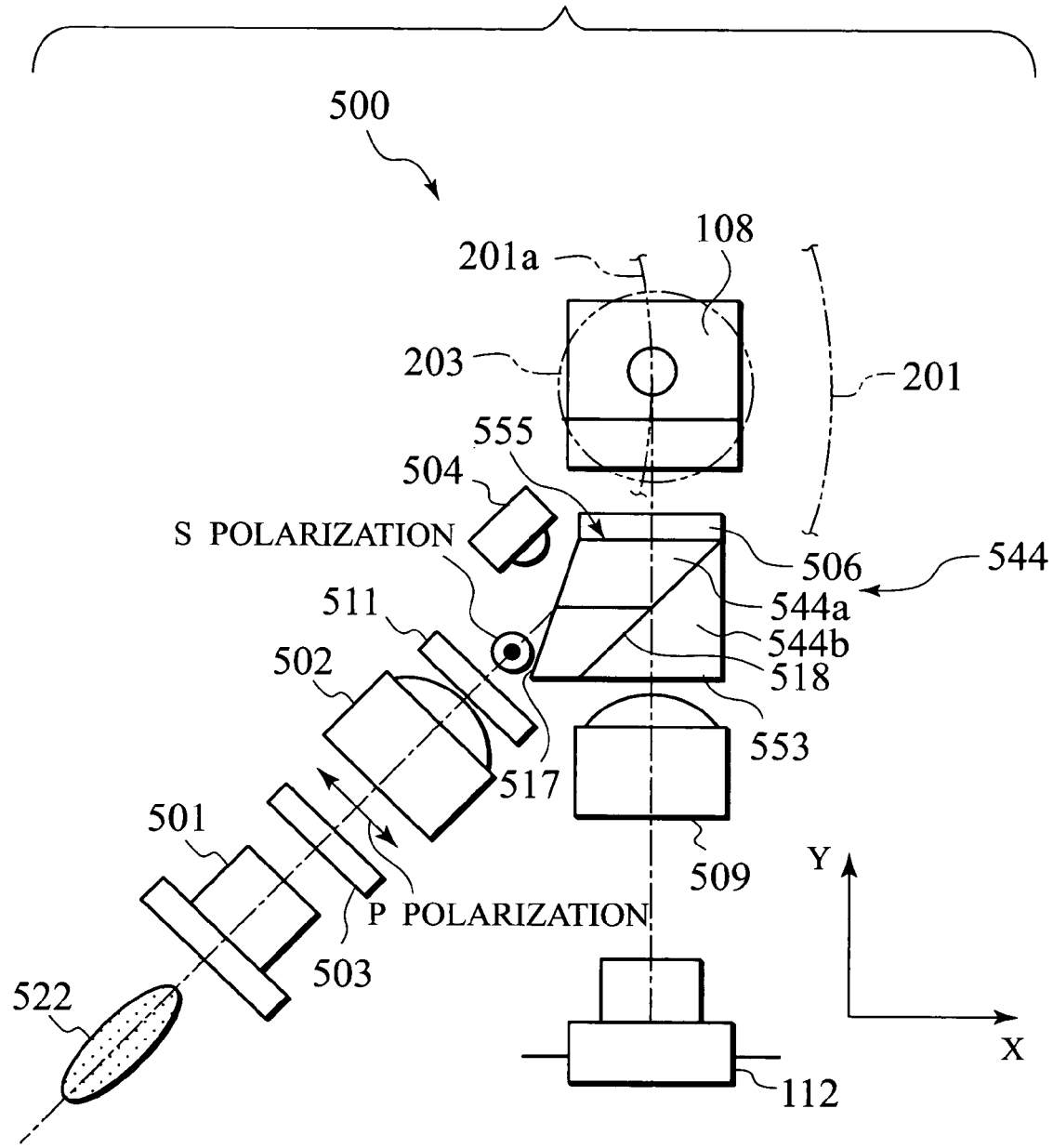
FIG. 26 is a schematic illustration of the structure of an optical pickup according to a fifth embodiment of the present invention.

FIG. 26 is a schematic illustration of the structure of an optical pickup according to a fifth embodiment of the present invention.

Like reference numerals are applied for elements of this fifth embodiment that are the same as those of the first and second embodiments and a description of those elements is omitted.

The optical pickup 500 of this fifth embodiment is similar to that of the third embodiment on the point of using a PBS film surface 518 have wavelength transmission characteristics as shown in FIG. 19. The optical pickup is also similar to that of the first embodiment in using an inclined surface 517 as a beam forming surface and in employing two collimator lenses 502 and 509.

More specifically, it is further described as follows.

As shown in FIG. 26, this optical pickup 500 comprises a primary laser light source 501 for emitting a primary laser light (650 nm) that is of sufficient power for recording, and an integrated device 112 further comprising a polarized light beam splitter 544 including a PBS film surface, a secondary light source emitting a secondary laser light (780 nm) that is of sufficient power for recording as well as light receiving means for receiving light from the primary and the secondary laser lights.

Here, the primary laser light source 501 is of the same configuration as the primary laser light source 301, however the primary laser light source 501 is set in position in relation to the polarized light beam splitter 544 such that the primary laser light source emits in the P polarized light direction.

Further, the optical pickup 500 has three beam generating means 503, a first collimator lens 502 and a ½ wavelength plate 511 disposed between the primary laser light source 501 and the polarized light beam splitter 544.

The three beam generating means 503 has the same structure as that of the three beam generating means 303.

The collimator lens 502 is of the same configuration as the collimator lenses 102 and 245.

The wavelength plate 511 rotates the direction of polarization to S polarization when primary laser light emitted from the primary laser light source 501 is P polarized light.

The polarized light beam splitter 544 has the inclined surface (beam forming surface) 517 for forming the cross sectional form of a beam of primary laser light entering the polarized light beam splitter 544 via the wavelength plate 511. This inclined surface 517 is of the same configuration and provides the same functions as the inclined surface 117 of the first embodiment.

As shown in FIG. 26, this optical pickup 500 has a front monitor 504 that is of the same configuration and provides the same functions as the front monitor 104.

Further, the integrated device 112 of the optical pickup 500 is of the same configuration and provides the same functions as the integrated devices 112 according to the first to third embodiments as described above.

As shown in FIG. 26, this optical pickup 500 further has a second collimator lens 509 disposed between the integrated device 112 and the polarized light beam splitter 544.

This collimator lens 509 has the same configuration and is of the same structure as the second collimator lens 109 of the first embodiment.

The polarized light beam splitter 544 has a first prism 544a and a second prism 544b, and a PBS film surface 518 having the wavelength transmission characteristics shown in FIG. 19 at the joining face of these prisms.

As shown in FIG. 26, the PBS film surface 518 is disposed at an angle of 45 degrees in relation to the X axis and Y axis set in the same manner as the X axis and the Y axis respectively as described with respect to the first to third embodiments, As shown in FIG. 26, the optical pickup 500 has a ¼ wavelength plate 506, a mirror 108 and an objective lens 203 disposed between the polarized light beam splitter 544 and an optical disk 201.

The ¼ wavelength plate 506 has the same configuration and provides the same functions as the ¼ wavelength plates 106 and 306.

The optical pickup 500 furnishes basically the same effects as the optical pickup 300 according to the third embodiment.

A point of difference between the effects of this optical pickup 500 and those of the optical pickup according to the third embodiment is that the cross sectional form of intensity distribution of the primary laser light in the case of the optical pickup 500 can be subject to beam formation, in the same manner as applies with the first embodiment.

More specifically, it is further described as follows.

As mentioned above, the primary laser light source 501 is set in position in relation to the polarized light beam splitter 544 such that the primary laser light is emitted as P polarized light. As shown in FIG. 26, here, the intensity distribution 522 of emitted primary laser light generally has an elliptical form, being of short diameter in the planar direction (the XY direction) of the page of FIG. 26, and a longer diameter along the axis orthogonal to that page (the Z direction).

After undergoing separation into three beams at the three beam generating means 503, the primary laser light emitted from the primary laser light source 501 and having P polarization is collimated at the collimator lens 502, and the direction of polarization is rotated 90 degrees to provide S polarized light at the ½ wavelength plate wavelength plate 511. At the time, the intensity distribution 522 of the emitted primary laser light has not been converted and is of the same elliptical form 522 as described above.

Accordingly, when the primary laser light enters the inclined surface 517 this light undergoes beam formation in the same manner as applies with respect to the first embodiment, such that the cross sectional form thereof becomes substantially circular.

Prior to entering the polarized light beam splitter 544, both the primary laser light and the secondary laser light pass the collimator lenses 502 and 509 and are therefore parallel light beams at the time of entering the polarized light beam splitter 544.

Figure 27:
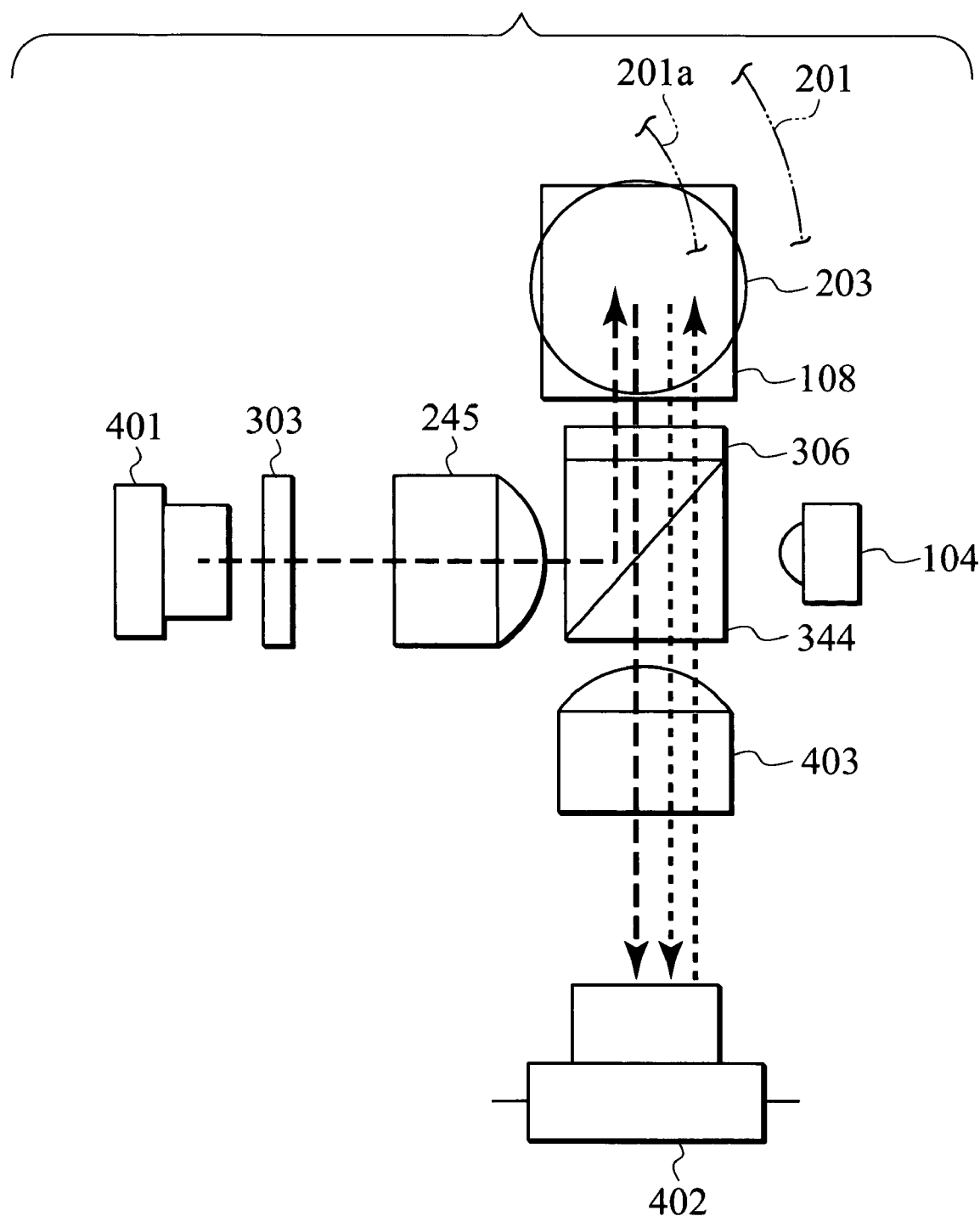
FIG. 27 is a schematic illustration of the structure of an optical pickup according to a sixth embodiment of the present invention.

FIG. 27 shows an optical system of an optical pickup according to a sixth embodiment of this invention, used for what is called a "combo drive" in which recording is only performed in the CD system.

In the above described embodiments from the second embodiment onwards the first wavelength is 650 nm (for DVD) and the second wavelength is 780 nm (for CD). This is because the primary laser light source side is a high output laser for recording and only in the outward path are the optical systems separated.

For this sixth embodiment the primary laser light source 401 is a 780 nm band high output laser for CD and integration is unnecessary as heat release is satisfactory, thus the primary laser light source 401 is realized as an independent component comprising a laser diode in can package. Further, a secondary laser light source emitting a secondary laser light having a second wavelength of 650 nm the (for DVD) is housed inside an integrated device 402.

The primary laser light (indicated by the middle dashed line in FIG. 27) emitted from the primary laser light source 401 is separated into three beams by three beam generating means (a grating) 303 before being formed into parallel beams at a collimator lens 245 and then injected into a polarized light beam splitter 344. This primary laser light is reflected at the polarized light beam splitter 344, passing a wavelength plate 306 before being irradiated on to a track 201a on an optical disk 201 after passing via a mirror 108 and an objective lens 203.

The primary laser light reflected at the information recording medium 201 travels via the objective lens 203, the mirror 108 and the wavelength plate 306 and is passed at the polarized light beam splitter 344 before being received at the light receiving regions of an integrated device 402.

The secondary laser light emitted from the integrated device 402 (the center dotted line in FIG. 27) is collimated at a collimator lens 403 and passed at the polarized light beam splitter 344, before traveling via the wavelength plate 306, the mirror 108 and objective lens 203 and being irradiated onto a track 201a on the information recording medium 201.

The secondary laser light reflected at this optical disk 201 travels via the objective lens 203, the mirror 108 and the wavelength plate 306, is passed at the polarized light beam splitter 344, travels via the collimator lens 403 and is received at the light receiving regions of the integrated device 402.

In this way, the optical pickup according to this sixth embodiment has basically the same optical system arrangement as the previously described embodiments, the return path light of the recording system only, traveling along a different route. However, in the case of the sixth embodiment polarized light is not used in the separation of outward path and return path light of the primary laser light.

Figure 28A:
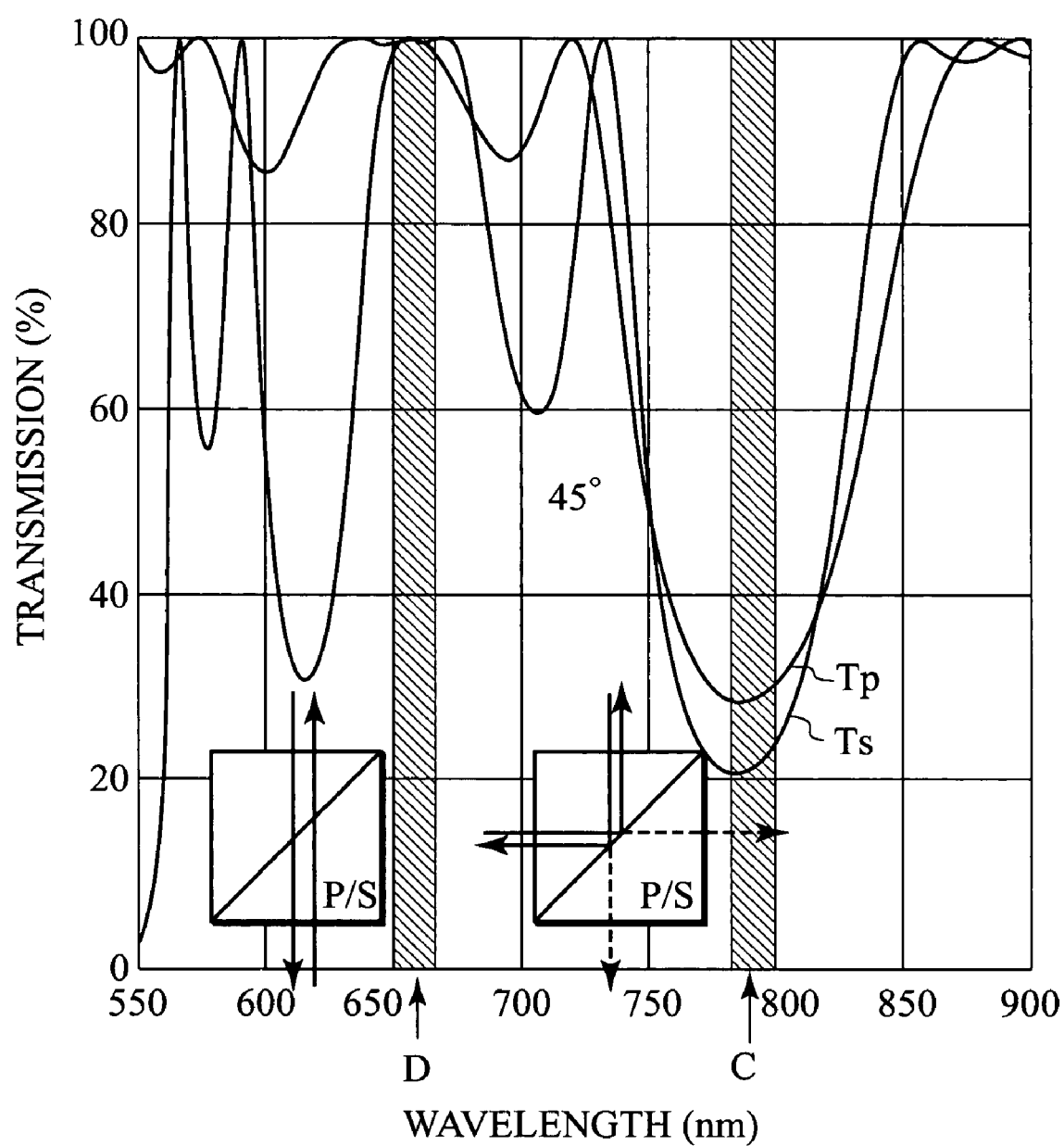

FIGS. 28A, 28B and 28C show the characteristics and design example of a prism for an optical pickup according to the sixth embodiment.

The polarized light beam splitter of this optical pickup operates such that an optical system dependent on polarization is avoided for the first wavelength 780 nm (C), and the transmission rate of P polarized light $T_p$ and the transmission rate of S polarized light $T_s$ are both substantially from 20 percent to 30 percent. Accordingly, 70 percent to 80 percent efficiency is obtained for outward path primary laser light using reflected light at the polarized light beam splitter 344 enabling assurance of sufficient power for recording on a disk.

Here, considering only the point of outward path efficiency, it would be preferable to further increase the rate of reflectivity, however outward and return efficiency that controls the replay signal level is 21 percent with the rate of reflectivity at 70 percent, 16 percent at a rate of reflectivity of 80 percent and 9 percent when the rate of reflectivity is 90 percent, such that if the rate of reflectivity increases deterioration is severe. Accordingly, a rate of reflectivity for the optical beam splitter should be from 70 percent to 90 percent and the rate of transmission from 10 percent to 30 percent.

In the case of secondary laser light the prism passes close to 100 percent of P polarized light. Thus, outward and return path light of secondary laser light is able to pass the prism as P polarized light, while the rate of S polarized light passed is 30 percent.

In the design example shown in FIG. 28A, FIG. 28B and FIG. 28C substantial variation occurs in response to changes in the angle of incidence and insertion of a PBS in divergent light is not preferable. Accordingly, as shown in FIG. 27, this sixth embodiment has a configuration using two collimator lenses 245 and 403 and the separation of the outward and return optical paths of the primary laser light is performed only in parallel light beams.

The PBS film surface of the polarized light beam splitter of this sixth embodiment is a 21 layer multilayered construction each layer being interposed between glass material. In FIG. 28B the thickness of each layer forming the PBS film surface is expressed as quarter wave optical thickness (QWOT=1). Here, BK7 indicates glass by Schott AG corresponding to the first and second prisms of the polarized light beam splitter. H indicates $CeO_2$ (cerium oxide), M is $LaF_3$ (lanthanum fluoride) and L is LiF (lithium fluoride). The refractive index is the refractive index in relation to 587.56 nm light (line d). The following shows calculations of the actual physical film thickness. The thickness is expressed in units of nm.

Layer 1: 47.14 H [nm]
Layer 2: 204.22M [nm]
Layer 3: 236 L [nm]
Layer 4: 159.73M [nm]
Layer 5: 113.47 H [nm]
Layer 6: 158.87M [nm]
Layer 7: 217.54 L [nm]
Layer 8: 145.92M [nm]
Layer 9: 104.55 H [nm]
Layer 10: 181.47M [nm]
Layer 11: 231.15 L [nm]
Layer 12: 181.47M [nm]
Layer 13: 104.55 H [nm]
Layer 14: 145.92M [nm]
Layer 15: 217.54 L [nm]
Layer 16: 158.87M [nm]
Layer 17: 113.47 H [nm]
Layer 18: 159.73M [nm]
Layer 19: 236 L [nm]
Layer 20: 204.22M [nm]
Layer 21: 47.144 H [nm]

Figure 29:
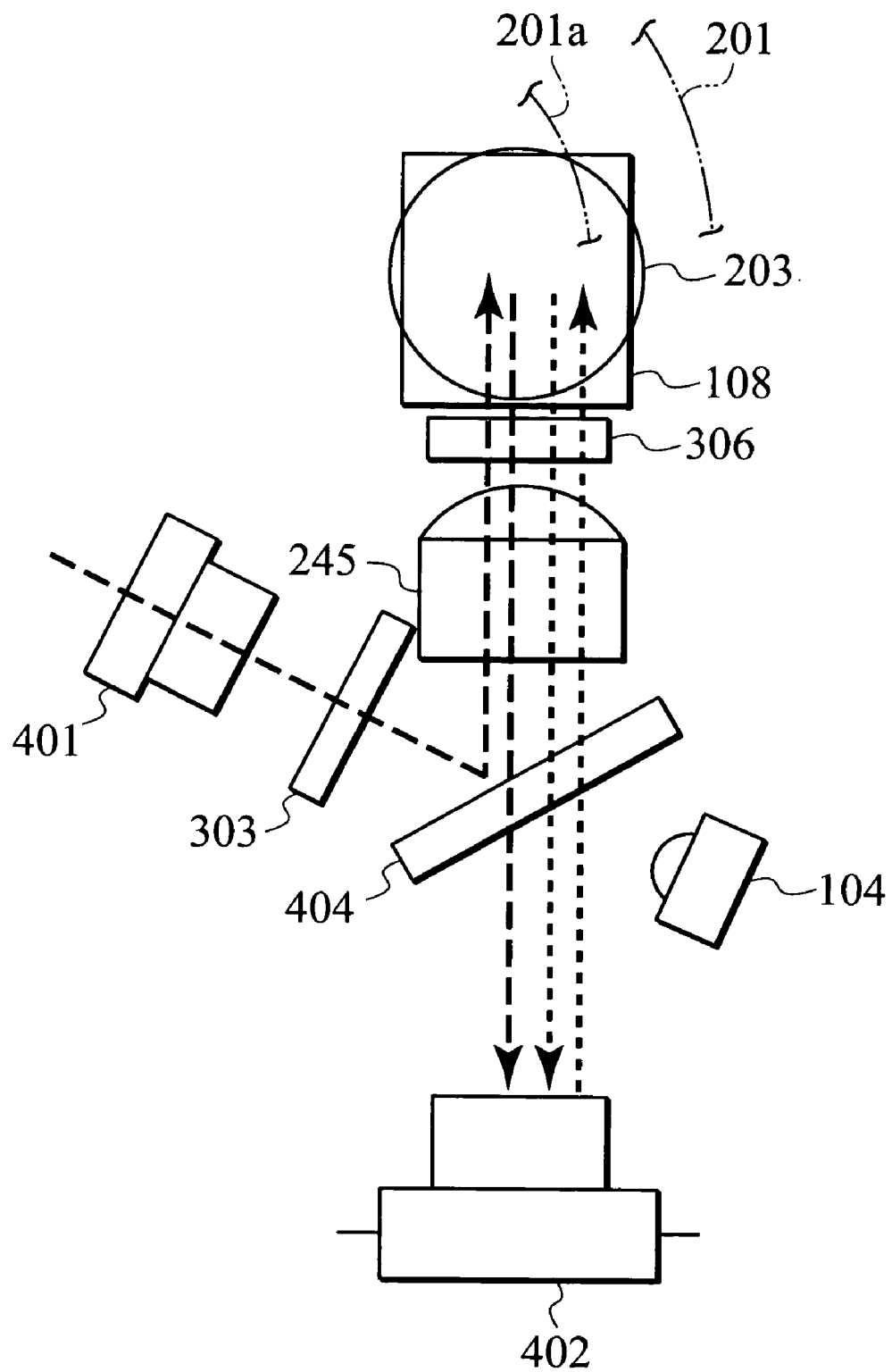
FIG. 29 is a schematic illustration of the structure of an optical pickup according to a seventh embodiment of the present invention.

FIG. 29 shows an optical system of an optical pickup according to a seventh embodiment of this invention, used for what is called a "combo drive" in which recording is only performed in the CD system.

In relation to the primary laser light the optical pickup of the sixth embodiment is as much as possible, an optical system independent of polarization, however characteristics enabling a more comprehensive system can be realized by having some degree of light polarization dependence.

That is to say, as described above, the majority of CD systems in the market employ an optical system independent of polarization, while having deteriorated playout characteristics from disks with substantial birefringence.

Here, an optical system independent of polarization refers to a system in which the sensitivity differential in relation to two orthogonal polarized light elements is 1:1 and when the sensitivity difference for two orthogonal polarized light elements is 1:0, this is termed a polarized light system. If this sensitivity differential is 1:0.5, problematic level changes caused by disturbance are at a level exactly between the levels of the two different optical systems.

As there are actual cases of worst case examples for an commercially available optical disk in which the tolerance at the system side substantially exceeds the limits, it is possible to replay by controlling the worst case for the optical disk within a permissible system range, if the sensitivity differential of the two orthogonal polarized light elements is relaxed to 1:0.5.

Based on this discovery, the optical pickup of the seventh embodiment is designed such that the differential of the efficiency of the prism for both outward and return path light (whether the ratio of light passed or reflected) is constrained to double.

According to the optical pickup of the seventh embodiment, a primary laser light (indicated by the middle dashed line in FIG. 29) of a first wavelength (780 nm region) emitted from a primary laser light source 401 is separated into three beams by three beam generating means (a grating) 303 and injected into a polarized light beam splitter 404.

The polarized light beam splitter 404 is different to the polarized light beam splitters used for the embodiments 1 to 6 as it is formed of a planar shaped member in which the surface into which the primary laser light enters and the surface emitting this primary laser light to the optical disk side as well as receiving the input of the return path light of this primary laser light reflected from the optical disk, are the same surface. That is to say, the primary laser light injected into this polarized light beam splitter 404 is reflected by the PBS film surface formed on the surface of this polarized light beam splitter 404.

The primary laser light reflected at the polarized light beam splitter 404 is collimated at the collimator lens 245 and irradiated on to the track 201a on the disk 201 after passing via a wavelength plate 306, a mirror 108 and an objective lens 203.

The primary laser light reflected from the information recording medium 201 passes via the objective lens 203, the mirror 108, the wavelength plate 306 and the collimator lens 245 and is passed at the polarized light beam splitter 404 then received by the light receiving regions of an integrated device 402.

Secondary laser light (indicated by the middle dotted line in FIG. 29) of a second wavelength (650 nm region) emitted from the integrated device 402, is passed at the polarized light beam splitter 404 and collimated at the collimator lens 245. This secondary laser light then travels via the wavelength plate 306, the mirror 108 and the objective lens 203 and is irradiated oil to the track 201a on the optical disk 201.

The secondary laser light reflected at the information recording medium 201 then travels via the objective lens 203, the mirror 108, the wavelength plate 306 and the collimator lens 245. This light is then passed at the polarized light beam splitter 404 and received by the light receiving regions of the integrated device 402.

Figure 30A:
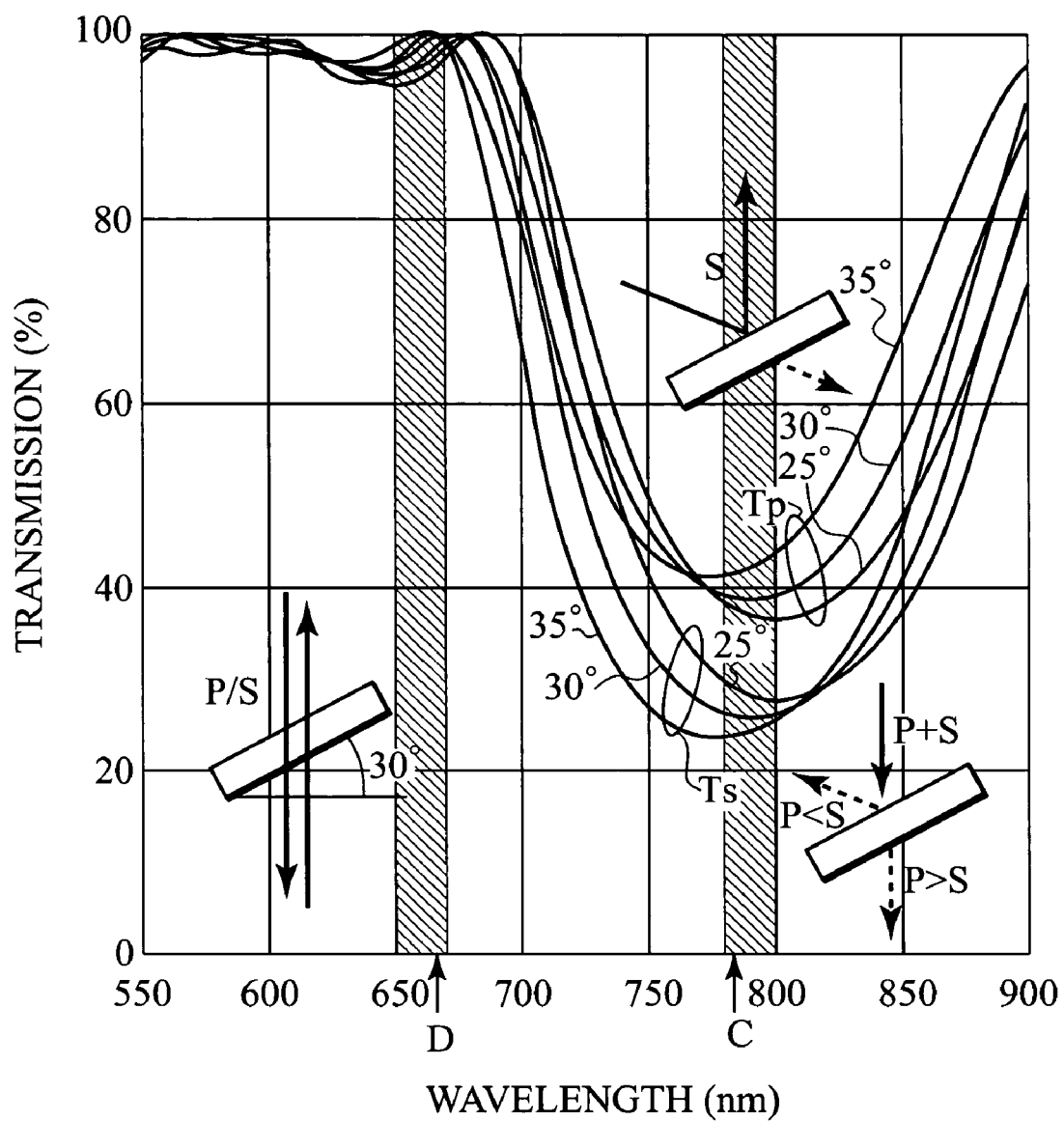

FIGS. 30A, 30B and 30C show the characteristics and design example of a prism for an optical pickup according to the seventh embodiment.

For the primary laser light (C) this design example enables efficiency of 70 percent intensity when for example S polarized outward path light is reflected, while an efficiency of 40 percent is realized in passing return path, P polarized light. FIG. 30A shows the rate of reflection of P polarized light $T_p$ and the rate of reflection of S polarized light $T_s$ when the angles of incidence to the surface of the polarized light beam splitter are 25 degrees, 30 degrees and 35 degrees.

Further, in the case of this optical pickup, if S polarized light elements are mixed in return path light due to replaying a disk having substantial birefringence, a pass ratio of approximately 30 percent is maintained. Accordingly, in the same manner as the optical system that is independent of polarization, this embodiment enables low signal level fluctuations to be achieved.

In this way, this embodiment enables both satisfactory efficiency of outward path, recording laser light and good playout properties from a disk having substantial birefringence.

Further, as the polarized light beam splitter of this seventh embodiment is a planar member, rather than consisting of a compound triangular cylindrical member, the materials costs are less expensive and assembly processes simplified. Moreover, a further advantage of this kind of planar shaped polarized light beam splitter is that it is easy to obtain a high degree of regularity in both surfaces thereof.

Further, as shown in FIG. 30A, this polarized light beam splitter {operates effectively where the angle of incidence is in the region of above ±5 degrees.} and can accordingly be inserted in divergent light. As shown in FIG. 29 a configuration having one collimator lens can be employed.

As shown in FIG. 29, as flat plate having parallel surfaces is inserted at an inclination to the outward path of the secondary laser light source (650 nm) in this optical pickup, there is concern that a degree of astigmatism may arise. Ensuring that astigmatism of the laser elements is of the direction and appropriate quantity to cancel this astigmatism arising from the polarized light beam splitter rectifies this. A coma aberration can be corrected for by purposefully facilitating tilt in other optical members. Further, this coma abberation can also be corrected by making the polarized light beam splitter a non planar, wedge shape.

Again, it is also preferable, in order to reduce the quantity of the occurrence of these kinds of aberrations, to reduce the angle of incidence of secondary laser light to the polarized light beam splitter and to reduce the thickness of the plate. A satisfactory solution can be obtained, as shown in the design example of FIG. 30B, with an angle of incidence of secondary laser light of 30 degrees. In addition to this, a plurality of solutions can be obtained with an angle of incidence in the range of below 40 degrees, enabling the appropriate settings to be realized by balancing the degree of aberrations occurring.

In FIG. 30B the thickness of each layer forming the PBS film surface is expressed as quarter wave optical thickness (QWOT=1). High transparency glass is used for the glass material. H indicates $TiO_2$ (titanium oxide) and L, $MgF_2$ (magnesium fluoride). The refractive index is the refractive index in relation to 587.56 nm light (line d). The following shows calculations of the actual physical film thickness. The thickness is expressed in units of nm.

Layer 1: 256.01 H
Layer 2: 463.92 L
Layer 3: 248.91 H
Layer 4: 335.28 L

Figure 31:
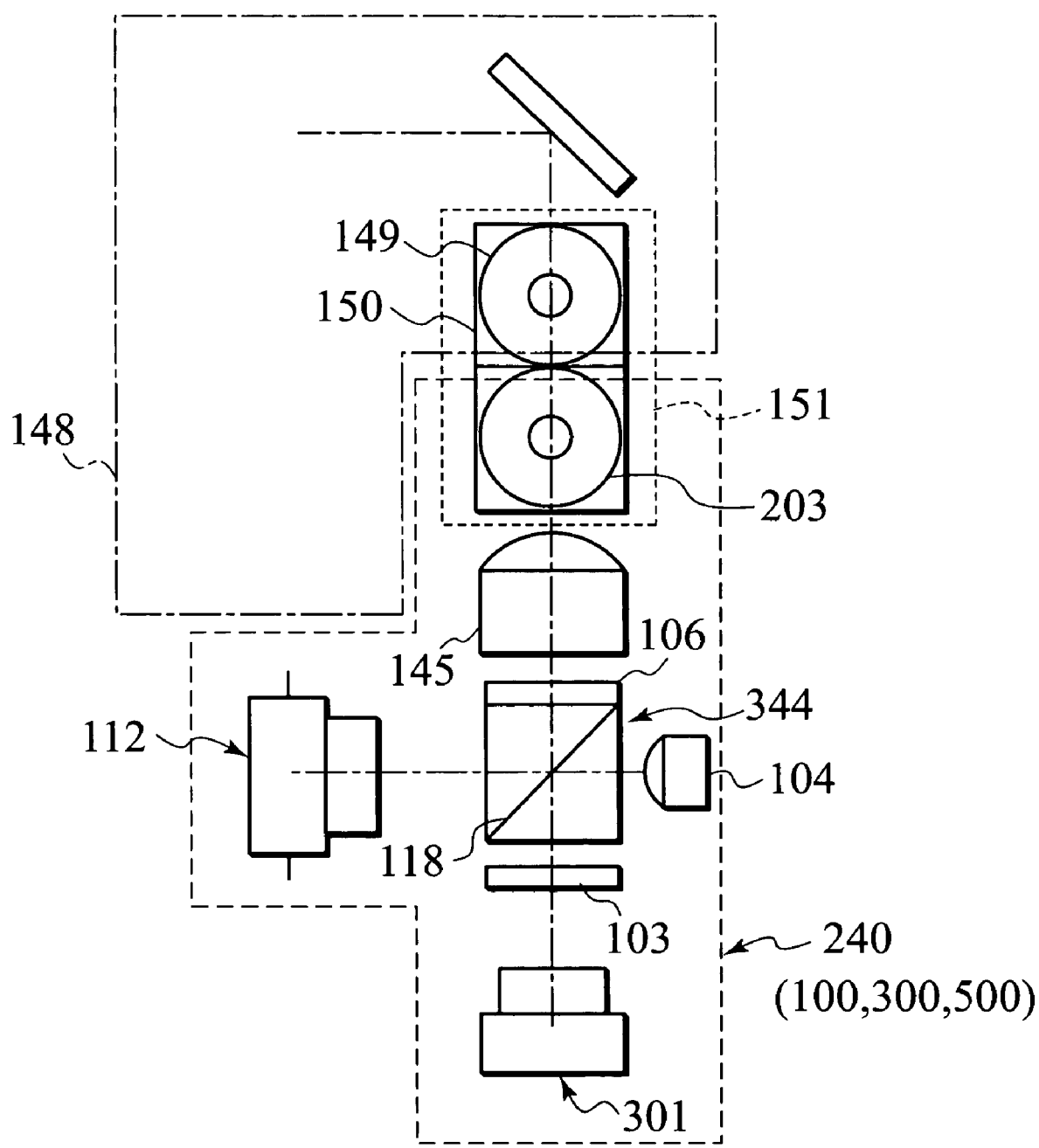
FIG. 31 is a plan view showing a schematic illustration of the structure of an optical pickup according to an eighth embodiment of the present invention.

FIG. 31 is a schematic illustration of an eighth embodiment according to the present invention.

Like reference numerals indicate those elements that are similar or the same as the respective elements of the first embodiment and second embodiment.

As shown in FIG. 31, the eighth embodiment is a two wave replay and recording optical system including the optical pickups 100, 240, 300 and 500 of the above embodiments 1 to 5 and a PU optical system for a high density disk system having a laser source emitting for example 400 nm band laser light. In FIG. 31, the optical pickup 240 of the second embodiment is drawn to represent this two wave replay and recording optical system, however this could also be the optical pickups 100, 300 or 500 of the first embodiment, the third embodiment or the fifth embodiments respectively.

Instead of the mirror 108 used in the first to fifth embodiments, this eighth embodiment has a mountain shaped prism 150 having a reflecting surface for directing the primary and secondary laser lights incoming from/outgoing to the optical pickups 100, 240, 300 and 500 in a direction perpendicular to the page, and a surface for directing a 400 nm band laser beam in the same direction.

Further, this eighth embodiment has a two lens actuator 151 for operation of an objective lens 203 used for the primary and secondary laser lights and an objective lens 149 for the 400 nm band laser light in an integrated manner.

The eighth embodiment so configured enables a replay and recording optical system using laser beams of three wavelengths to be easily constructed in a small and compact form.

Figure 32:
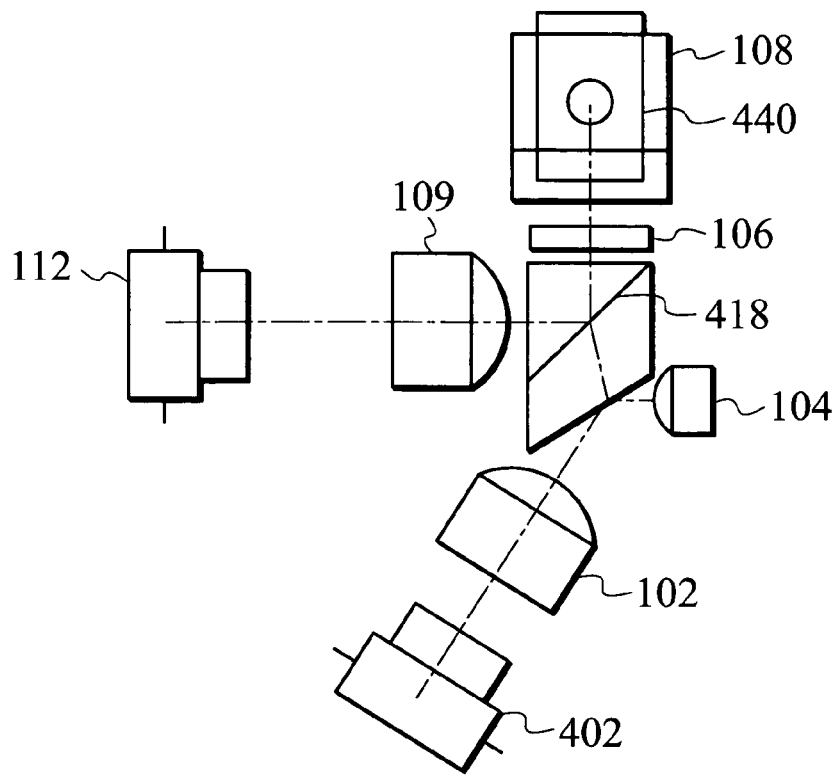
FIG. 32 is a schematic illustration showing an embodiment of reference of an optical pickup according to the present invention.

FIG. 32 is a schematic illustration showing a first embodiment for reference of an optical pickup according each of the embodiments of the present invention.

Those elements of this eighth embodiment that are similar or the same as the elements of each of the above described embodiments have like reference numerals to indicate those elements and a description of such elements is omitted.

In FIG. 32, this embodiment for reference of an optical pickup comprises for example light receiving and emitting elements for receiving and emitting laser light of 650 nm, a first collimator lens 102 for this 650 nm laser light, a dichroic mirror 418, a front monitor 104, secondary light receiving and emitting elements 112 for receiving and emitting 780 nm laser light, a second collimator lens 109, a wavelength plate 106, a mirror 108 and a polarized light hologram 440.

In this configuration the polarized light hologram 440 separates or distinguishes light directed to an optical disk not shown in the drawing and light reflected from that optical disk.

Primary laser light from a primary integrated device 402 reflected from the optical disk returns to the primary integrated device 402 and is received by the light receiving elements inside the device. Further, secondary laser light emitted from a secondary integrated device 112 is reflected at the optical disk and then reflected at the dichroic mirror, before being received by the light receiving elements disposed in that secondary integrated device 112.

Four light receiving and emitting functions are concentrated in two elements in this optical pickup.

The integrated devices 402 and 112 are each of an integrated structure, and in comparison to each of the integrated devices described with respect to the above embodiments, the integrated devices of this eighth embodiment are relatively complex in structure. Further, as the polarized light hologram 440 is required a greater number of parts make up this optical pickup of the eighth embodiment.

Figure 33:
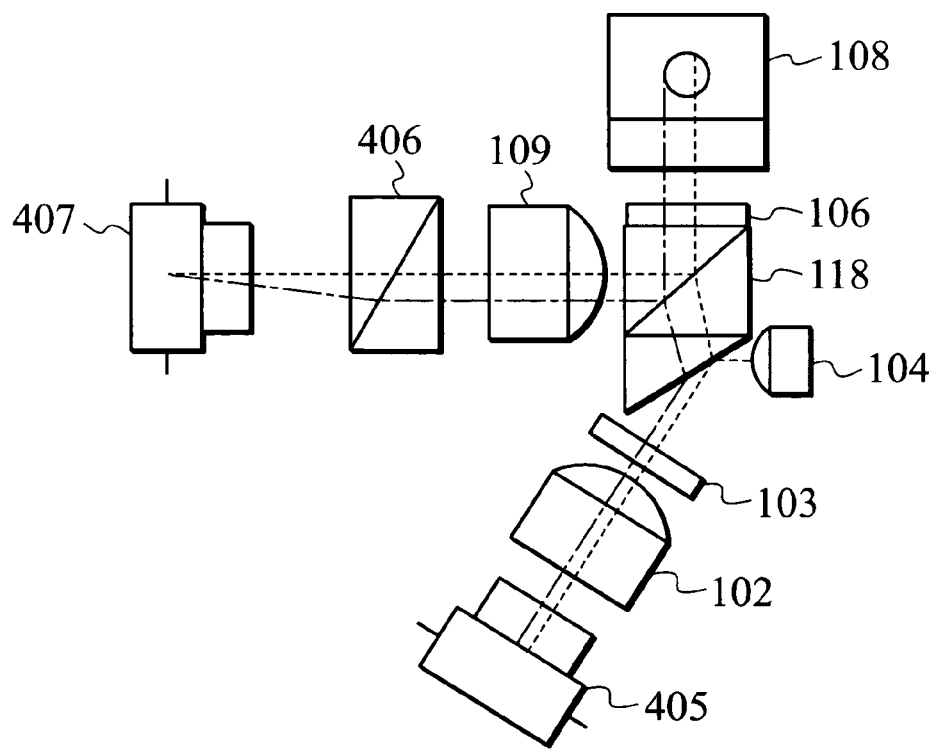
FIG. 33 is a schematic illustration showing another embodiment for reference of an optical pickup according to the present invention.

FIG. 33 is a schematic illustration showing an embodiment for reference of an optical pickup according to the present invention.

Those elements that are similar or the same as the elements of each of the above described embodiments have like or similar reference numerals and a description of such elements is omitted.

As shown in FIG. 33, the optical pickup according to this second embodiment for reference comprises a primary integrated device 405 further comprising respective laser light sources for outputting a primary laser light (having a wavelength of for example 650 nm) and a secondary laser light (having a wavelength of for example 780 nm), a first collimator lens 102, a first grating 103, a monitor 104, a PBS (polarized light beam splitter) 118, a wavelength plate 106, a second collimator lens 109, a birefringence prism 406 and a second integrated device 407 further comprising light receiving elements for receiving the primary laser light and the secondary laser light.

In this optical pickup the primary laser light and the secondary laser light are emitted from the integrated device 405. After these laser lights are reflected at an optical disk the lights are reflected at the PBS 118 and pass via the collimator lens 109 and the birefringence prism 406 before being received at the light receiving elements 407.

As shown in the drawing, in this embodiment for reference beam formation for two wavelengths is performed at the same prism. Normally, substantial chromatic aberration occurs when beam formation is performed at a single inclined surface thus the coexistence of two wavelengths creates difficulties. Accordingly, in order to realize satisfactory optical properties in such a configuration, what is known as "achromatism" that uses a plurality of glass members for refractive index and a plurality of refractive interfaces is required, leading to increased complexity and costs.

Further, the light emitting points of the primary laser light and the secondary laser light are mutually displaced in the horizontal direction along the forward traveling direction thereof. Accordingly the optical paths of the primary and secondary laser lights after the birefringence prism 406 can be matched over the light receiving elements 407. This results in an increase in the number of parts.

The above described first to eighth embodiments of the present invention enable realization of a structure for a two wavelengths recording optical pickup that is both simple and compact.

In other words, the above described first to eighth embodiments of the present invention provide a simple optical pickup that is compatible with recording type optical disk standards using 650 nm band region laser light such as for DVD-RAM, DVD-R, DVD-RW, DVD+R and DVD+RW or the like, as well as recording type optical disk standards using 780 nm band region laser light such as for CD-R or CD-RW or the like.

Further, according to the above described embodiments, heat release is easily achieved when using a high output laser light source of for example the 650 nm band region.

Again, the third embodiment provides an optical pickup suitable as a mutually compatible recording and playback system with a recording type optical disk using 400 nm band region laser light such as what is known as Blue-Beam Disc or the like.

The above described embodiments of the present invention are illustrative and not restrictive.

For example, the primary laser light may have wavelengths of either the 400 nm, 650 nm or 780 nm wavelength bands and the secondary laser light may have wavelengths of a wavelength band different to those of the primary laser light from either the 400 nm, 650 nm or 780 nm wavelength bands.

As described, an optical pickup is provided that performs recording and playback compatible with recording type optical disk standards using 650 nm band region laser light such as for DVD-RAM, −R, −RW, +R and +RW or the like, as well as recording type optical disk standards using 780 nm band region laser light such as for CD-R or RW or the like, and further is suitable for a system the objective of which is to use either of these for recording.

Basically, using a simple device configuration of one integrated device and one laser diode in can package enables all of the requirements that form the conditions for each system, including an optical system dependent on polarization, an optical system independent of polarization and laser heat release to be realized.

Moreover, a variety of combinations can be achieved by selecting the number of collimator lenses, the angle of optical path separation, or a cube prism polarized light beam splitter or planar member polarized light beam splitter for example, such that the optimum design can be realized to suit the objective and designs can be implemented flexibly in order to reduce costs or satisfy demands for downsizing or high-performance.

That is to say, the present invention provides an optical pickup that enables playback using a plurality of wavelengths while also enabling recording to be performed using at least one of these wavelengths, in a structure that is both simple and compact, while achieving satisfactory heat release from the light source for the wavelength used for recording.

The invention claimed is:

1. An optical pickup comprising:
    a primary laser light source for emitting a primary laser light having a first wavelength and having sufficient power for recording;
    an integrated device further comprising a secondary laser light source for emitting a secondary laser light having a second wavelength that is longer than the first wavelength and having sufficient power for recording as well as light receiving means for receiving light of the primary and secondary laser lights; and
    laser light optical path separating elements that are a polarized light beam splitter further comprising a first surface into which the first laser light emitted from the primary laser light source is injected, that has polarization selectivity in respect of the primary laser light having the first wavelength and no polarization selectivity in respect of the secondary laser light having the second wavelength, a second surface from which the primary laser light is emitted to the information recording medium side and into which return path light of the primary laser light from the information recording medium side is injected and a third surface from which the return path light is emitted to the integrated device side.

2. The optical pickup according to claim 1 wherein the laser light optical path separating elements pass all primary laser light having P polarization in relation to thereto, while reflecting all primary laser light having S polarization and reflecting all of the secondary laser light regardless of the polarization thereof.

3. The optical pickup according to claim 1 wherein the laser light optical path separating elements pass all of the primary laser light having P polarization in relation thereto, while reflecting all of the primary laser light having S polarization and passing all of the secondary laser light regardless of the polarization thereof.

4. The optical pickup according to claim 1 wherein the laser light optical path separating elements have a fourth surface that passes, from among the primary laser light, P polarized light components in relation to this polarized light beam splitter, passes from 5 percent to 20 percent of S polarized light components while reflecting the remainder, reflects all of the secondary laser light regardless of the direction of polarization thereof and emits from 5 percent to 20 percent of the primary laser light to light quantity detecting elements in the forward direction thereto.

5. The optical pickup according to claim 1 wherein the laser light optical path separating elements of this optical pickup pass primary laser light emitted from the primary laser light source toward the information recording medium side and reflect return path light of the primary laser light from the information recording medium to the integrated device side, reflect the secondary laser light from the secondary laser light source to the information recording medium side and reflect the secondary laser light from the information recording medium to the integrated device side, and the light receiving elements receive light that is return path light of the primary laser light or the secondary laser light from the information recording medium, emitted from the laser light optical path separating elements.

6. The optical pickup according to claim 5 wherein the laser light optical path separating elements function, in relation to wavelengths of the primary laser light, to pass P polarized light and to reflect S polarized light, and function, in relation to wavelengths of the secondary laser light, as a total light reflecting prism reflecting both P polarized light and S polarized light.

7. The optical pickup according to claim 5 wherein the primary laser light source, the integrated device and the laser light optical path separating elements are disposed such that the optical axes connecting therebetween are positioned on the same plane, the primary laser light source is disposed such that the direction of polarization of the primary laser light is parallel to that plane and the secondary laser light source is disposed such that the direction of polarization of the secondary laser light is perpendicular to that plane.

8. The optical pickup according to claim 4 wherein a collimator lens that collimates the primary laser light and the secondary laser light traveling from the laser light optical path separating elements to the objective lens is disposed between the laser light optical path separating elements and objective lens.

9. The optical pickup according to claim 1 wherein the laser light optical path separating elements reflect the primary laser light emitted from the primary laser light source to the information recording medium side, pass return path light of the primary laser light from the information recording medium to the integrated device side, pass the secondary laser light from the secondary laser light source to the information recording medium side and pass return path light of the secondary laser light from the information recording medium to the integrated device side, and the light receiving means receives return path light of the primary laser light source and the secondary laser light source from the information recording medium, emitted from the laser light optical path separating elements.

10. The optical pickup according to claim 9 wherein the laser light optical path separating elements function, in relation to wavelengths of the primary laser light, to reflect S polarized light and to pass P polarized light, and function, in relation to wavelengths of the secondary laser light, as a light passing member that passes both P polarized light and S polarized light.

11. The optical pickup according to claim 1 wherein a primary collimator lens for collimating the primary laser light from the primary laser light source is disposed between the primary laser light source and the laser light optical path separating elements and a secondary collimator lens for collimating the secondary laser light from the secondary laser light source is disposed between the integrated device and the laser light optical path separating elements.

12. The optical pickup according to claim 11 wherein the laser light optical path separating elements of this optical pickup have an inclined surface that, in order to make the plane of incidence of a parallel light beam of the primary laser light made parallel by the first collimator lens into a circular form, is inclined in relation to the optical axis of that parallel light beam.

13. The optical pickup according to claim 1 wherein the primary laser light has a wavelength of the 650 nm band and that the secondary laser light has a wavelength of the 780 nm band.

14. The optical pickup according to claim 1 wherein the long axial direction of the intensity distribution of the primary laser light emitted from the primary laser light source is in the plane including the first to third optical paths.

15. The optical pickup according to claim 1 wherein the laser light optical path separating elements operate in respect of the secondary laser light such that the ratio of P polarized light that is passed is greater than the ratio of S polarized light.

* * * * *